(12) United States Patent
Iwasaki

(10) Patent No.: US 8,926,160 B2
(45) Date of Patent: Jan. 6, 2015

(54) LIGHT GUIDE PLATE, PLANAR LIGHTING DEVICE, AND LIQUID CRYSTAL DISPLAY DEVICE

(71) Applicant: FUJIFILM Corporation, Minato-ku Tokyo (JP)

(72) Inventor: Osamu Iwasaki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 137 days.

(21) Appl. No.: 13/788,426

(22) Filed: Mar. 7, 2013

(65) Prior Publication Data

US 2013/0258707 A1    Oct. 3, 2013

Related U.S. Application Data

(63) Continuation of application No. PCT/JP2011/066451, filed on Jul. 20, 2011.

(30) Foreign Application Priority Data

Sep. 8, 2010    (JP) .................................. 2010-201396

(51) Int. Cl.
*F21V 7/04* (2006.01)
*F21V 8/00* (2006.01)
*G02F 1/1335* (2006.01)

(52) U.S. Cl.
CPC ............ *G02B 6/0041* (2013.01); *G02B 6/0046* (2013.01); *G02B 6/005* (2013.01); *G02F 1/133606* (2013.01); *G02B 6/0051* (2013.01); *G02B 6/0053* (2013.01); *G02B 6/088* (2013.01)
USPC ............ 362/615; 362/616; 362/620; 362/558

(58) Field of Classification Search
CPC ............ G02F 1/133504; G02B 6/0088; G02B 6/0041; G02B 6/0046; G02B 6/005
USPC .......... 362/602, 605, 615, 616, 617, 620, 558
See application file for complete search history.

(56) References Cited

U.S. PATENT DOCUMENTS 5,966,192 A    10/1999    Higuchi et al.
(Continued)

FOREIGN PATENT DOCUMENTS

| JP | 7-036037 A | 2/1995 |
| JP | 8-220346 A | 8/1996 |
| JP | 8-248233 A | 9/1996 |
| JP | 8-271739 A | 10/1996 |

(Continued)

OTHER PUBLICATIONS

Translation of International Preliminary Report on Patentability and Written Opinion, mailed Apr. 18, 2013, issued in corresponding International Application No. PCT/JP2011/066451, 5 pages.

*Primary Examiner* — Ali Alavi
(74) *Attorney, Agent, or Firm* — Sughrue Mion, PLLC

(57) ABSTRACT

The light guide plate has at least two layers which are superposed on each other in the direction almost perpendicular to the light exit surface and contain the scattering particles at different particle concentrations, the scattering particles are polydisperse particles including a mixture of particles with different particle sizes, and the combined particle concentrations in each portion of the light guide plate is different by changing the thicknesses of the first layer and the second layer in the direction almost perpendicular to the exit surface.

20 Claims, 20 Drawing Sheets

(56) References Cited

U.S. PATENT DOCUMENTS

| | | | |
|---|---|---|---|
| 5,993,020 | A | 11/1999 | Koike |
| 6,217,184 | B1 | 4/2001 | Koike et al. |
| 8,827,474 | B2 * | 9/2014 | Yamamoto et al. ............. 362/19 |
| 2009/0034294 | A1 * | 2/2009 | Ookawa et al. ............... 362/620 |
| 2009/0040787 | A1 * | 2/2009 | Nagata et al. ................. 362/619 |
| 2009/0103327 | A1 | 4/2009 | Iwasaki et al. |
| 2009/0103328 | A1 | 4/2009 | Iwasaki |
| 2013/0114291 | A1 * | 5/2013 | Brick et al. ................... 362/606 |

FOREIGN PATENT DOCUMENTS

| | | |
|---|---|---|
| JP | 11-153963 A | 6/1999 |
| JP | 2003-090919 A | 3/2003 |
| JP | 2004-055327 A | 2/2004 |
| JP | 2004-171948 A | 6/2004 |
| JP | 2005-108676 A | 4/2005 |
| JP | 2005-302322 A | 10/2005 |
| JP | 4127897 B2 | 7/2008 |
| JP | 2009-117349 A | 5/2009 |
| JP | 2009-117357 A | 5/2009 |

* cited by examiner

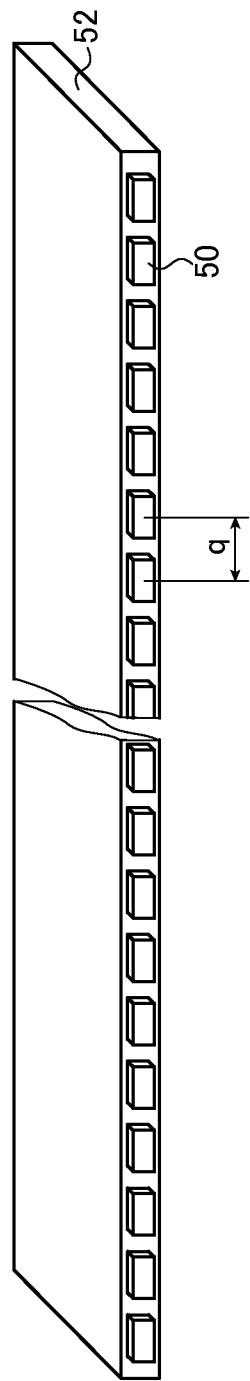

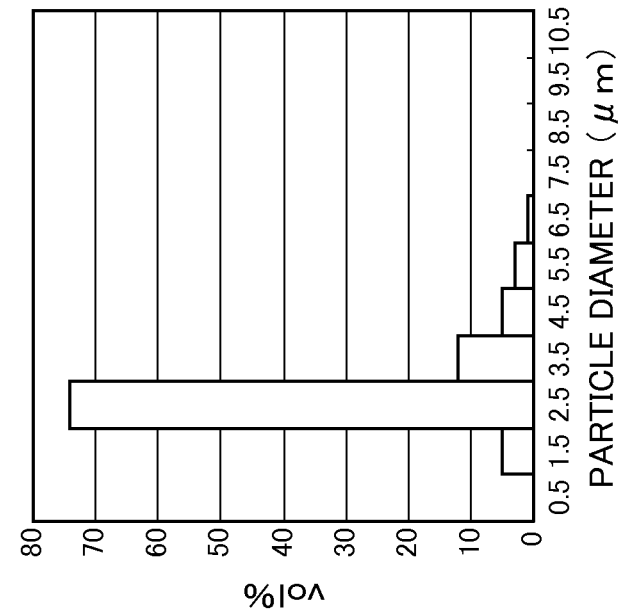
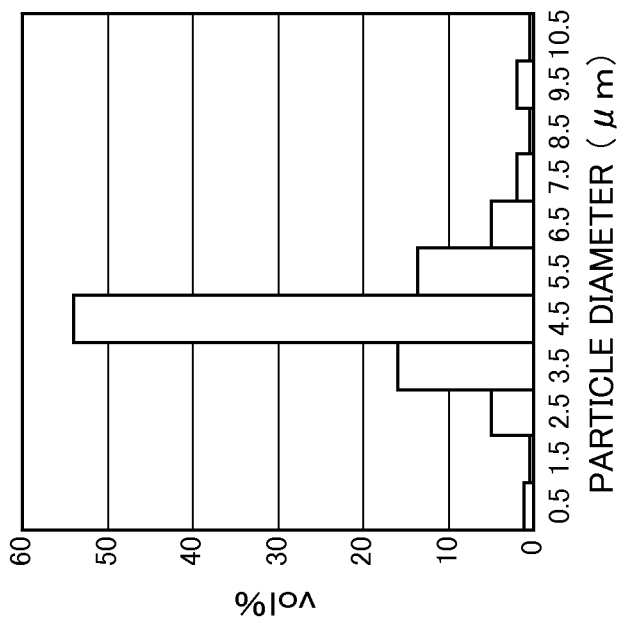

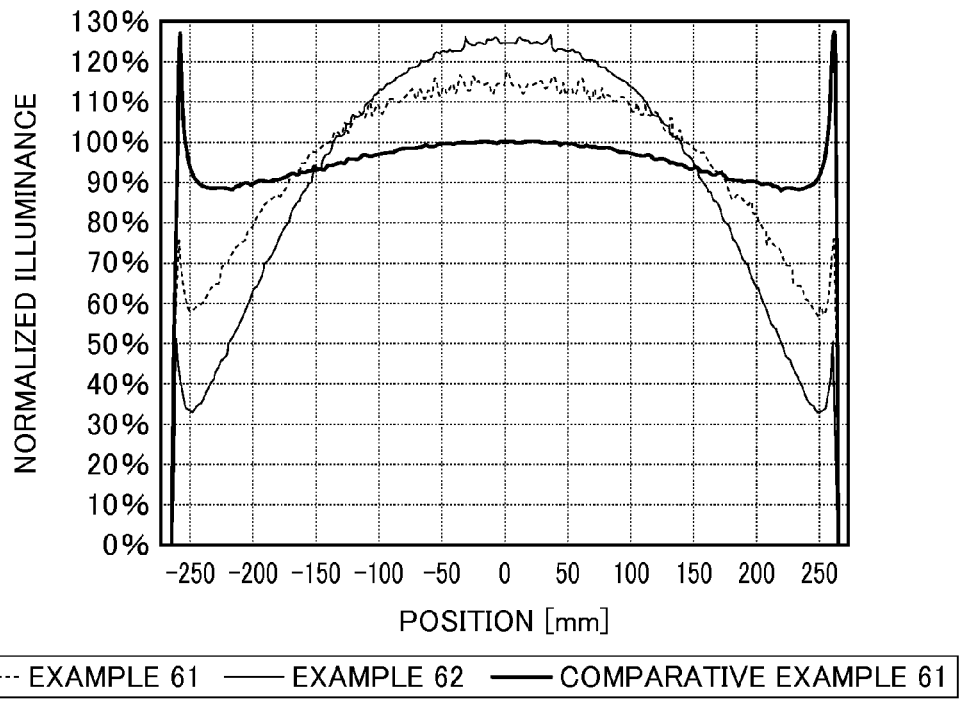
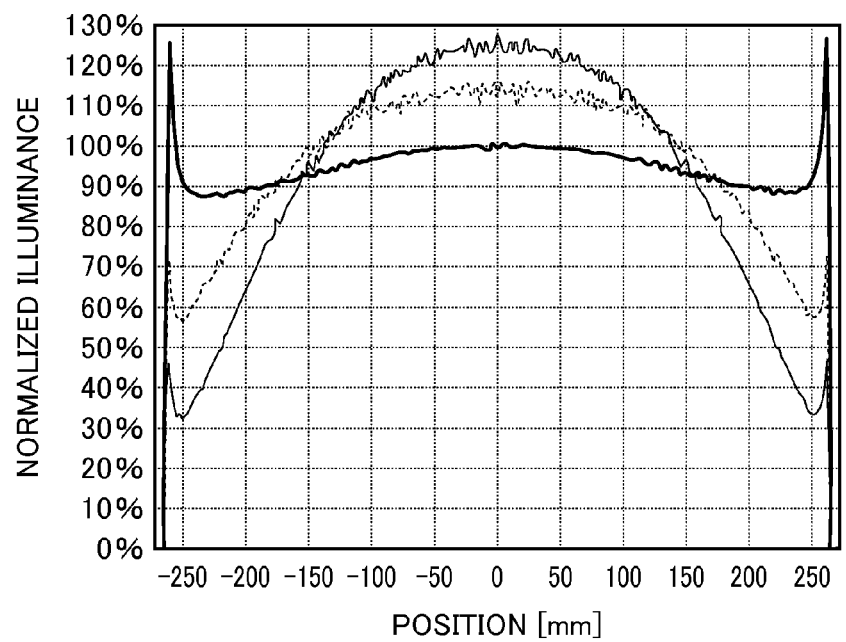

DISTANCE FROM LIGHT INCIDENCE SURFACE (mm)

LIGHT GUIDE PLATE, PLANAR LIGHTING DEVICE, AND LIQUID CRYSTAL DISPLAY DEVICE

TECHNICAL FIELD

The present invention relates to a light guide plate that may be used in liquid crystal displays and the like.

BACKGROUND ART

A liquid crystal display uses a backlight unit which illuminates a liquid crystal display panel by irradiation of light from the back side of the liquid crystal display panel. The backlight unit is configured using a light guide plate for diffusing light emitted from an illumination light source to illuminate the liquid crystal display panel and parts such as a prism sheet and a diffusion sheet for making outgoing light from the light guide plate uniform.

Currently, large-sized liquid crystal televisions predominantly use a so-called underneath type backlight unit including a light guide plate disposed immediately above an illumination light source. This type of backlight unit ensures uniform light amount distribution and necessary luminance by disposing a plurality of cold cathode tubes used as light sources behind the liquid crystal display panel and providing the inside with white reflection surfaces.

However, the underneath type backlight unit requires a thickness of about 30 mm in a direction perpendicular to the liquid crystal display panel in order to make the light amount distribution uniform and further reduction in thickness is difficult to achieve.

On the other hand, an exemplary backlight unit that allows the thickness reduction includes one using a light guide plate which receives light emitted from an illumination light source, guides the received light in predetermined directions and emits the guided light through a light exit surface that is different from the surface through which the light entered.

As the backlight unit using the light guide plate as described above, there has been proposed a backlight unit of a type using a light guide plate in plate form which is obtained by incorporating scattering particles for scattering light in a transparent resin and which receives light through its lateral faces and emits the received light through the front face.

For example, Patent Literature 1 describes a light scattering and guiding light source device comprising a light scattering guide having at least one light incidence surface region and at least one light exit surface region and light source means for light incidence through the light incidence surface region, the light scattering guide having a region that has a tendency to decrease in thickness with increasing distance from the light incidence surface.

Patent Literature 2 describes a surface light source device comprising a light scattering guide, a prism sheet provided on the side of the light scattering guide closer to the light exit surface, and a reflector provided on the back side of the light scattering guide. Patent Literature 3 describes a liquid crystal display comprising a light emitting direction correcting element which is formed of a plate-shaped optical material and includes a light incidence surface having a repeated undulate pattern of prism arrays and a light exit surface having light diffusing properties. Patent Literature 4 describes a light source device comprising a light scattering guide provided with scattering ability inside and light supply means for supplying light through an end face portion of the scattering guide.

Also proposed in addition to the above light guide plates are a light guide plate having a larger thickness at the center thereof than at an end on the light incidence side and at the opposite side end; a light guide plate having a reflection surface inclined in such a direction that the thickness of the light guide plate increases with increasing distance from a light entrance portion; and a light guide plate having such a shape that the distance between the front surface portion and the rear surface portion is the smallest at the light entrance portion and that the thickness of the light guide plate is the largest when the distance from the light entrance portion is the largest (See, for example, Patent Literatures 5 to 8).

In addition, Patent Literatures 9 and 10 each describe a lighting device having a light guide plate of which the light exit surface is concave, and Patent Literature 11 describes a light guide plate of which the light exit surface is downwardly convex (i.e., the light exit surface is concave).

Patent Literature 11 discloses a two-layer light guide plate in which the interface between the first layer and the second layer is inclined in the direction approaching the light exit surface with increasing distance from one end toward the center of the light guide plate (so that the cross section is in the shape of an isosceles triangle).

In addition, Patent Literature 12 describes a planar light source device comprising a sheet member in which at least one non-scattering light guide region and at least one scattering light guide region containing particles with different refractive indices uniformly dispersed in the same material as the non-scattering light guide region overlap each other, a light source lamp being mounted on one end face, the distribution state of the amount of light emitted from the main surface being controlled by locally adjusting the particle concentration in the sheet thickness of both the regions, the scattering light guide region including convex light guide blocks and the non-scattering light guide region including concave light guide blocks corresponding to the convex light guide blocks.

CITATION LIST

Patent Literature

Patent Literature 1: JP 7-36037 A
Patent Literature 2: JP 8-248233 A
Patent Literature 3: JP 8-271739 A
Patent Literature 4: JP 11-153963 A
Patent Literature 5: JP 2003-90919 A
Patent Literature 6: JP 2004-171948 A
Patent Literature 7: JP 2005-108676 A
Patent Literature 8: JP 2005-302322 A
Patent Literature 9: JP 8-220346 A
Patent Literature 10: JP 2009-117349 A
Patent Literature 11: JP 2009-117357 A
Patent Literature 12: JP 4127897 B (JP 11-345512 A)

SUMMARY OF INVENTION

Technical Problems

However, the backlight unit of, for example, a tandem type using a light guide plate of which the thickness decreases with increasing distance from the light source suffers from inferior light use efficiency to the underneath type in relation to the relative dimensions of the cold cathode tubes and the reflector although the backlight unit can be reduced in thickness. Further, in cases where the light guide plate used is so shaped as to receive cold cathode tubes in grooves formed therein, the light guide plate can be shaped in such a manner that the thickness decreases with increasing distance from the cold cathode tubes but the reduction in the thickness of the light guide plate increases the luminance just above the cold cathode tubes disposed in the grooves, thus causing uneven luminance on the light exit surface to stand out. In addition, the light guide plates of these types each have a complex shape and therefore increase machining costs, thus leading to increased costs when used in the backlight of a large-sized liquid crystal television having a screen size of, for example, 37 inches or more and in particular 50 inches or more.

Patent Literatures 5 to 8 propose light guide plates of which the thickness is increased with increasing distance from the light incidence surface in order to achieve stable manufacturing while suppressing luminance unevenness (unevenness in the amount of light) using multireflection. However, these light guide plates are transparent members and allow light received from the light source to penetrate to the opposite end side and therefore need to have prisms or dot patterns on the lower surface thereof.

There is also a method in which a reflection member is provided at the opposite end from the light incidence surface to emit the incident light through the light exit surface by multireflection. However, an increase in size involves increases in thickness and weight of the light guide plate and the costs are also increased. Further, the light sources are projected into the light guide plate and perceived as such to cause uneven luminance and/or uneven illuminance.

In the lighting device described in Patent Literature 9, the reflection surface is provided with serration grooves to serve as the diffuse reflection surface and therefore the light guide plate is to be increased in thickness in order to get larger in size. This involves an increase in weight and a complicated machining process, thus leading to increased costs.

The planar lighting device described in Patent Literature 10 includes the light guide plate of which the light exit surface is definitely concave. However, scattering particles are uniformly mixed in the whole of the light guide plate, which makes it difficult to further reduce the thickness in terms of optical properties. In addition, the light incidence surface is small, which hinders improvement of the light use efficiency (light incidence efficiency) without increasing the weight of the light guide plate.

The light guide plate described in Patent Literature 11 is certainly a light guide plate having two layers, the interface between the first layer and the second layer being inclined in the direction approaching the light exit surface with increasing distance from the ends toward the center of the light guide plate, and the light guide plate having a cross-sectional shape of an isosceles triangle. However, adjustment of the shape of the second layer to optimize the amount of outgoing light has not been taken into account.

Also in the planar light source device described in Patent Literature 12, adjustment of the shape of the scattering light guide region to optimize the amount of outgoing light has not been taken into account. Further, a large-sized light guide plate expands and contracts greatly due to ambient temperature and humidity changes and repeats expansion and contraction of 5 mm or more in a size of about 50 inches. Therefore, it is not known on which side a flat light guide plate warps, on the light exit surface side or the reflection surface side. If the light guide plate warps on the light exit surface side, the light guide plate expands and contracts to push up the liquid crystal panel to cause pool-like unevenness in light emitted from the liquid crystal display. To avoid this, one may consider preliminarily providing a great distance between the liquid crystal panel and the backlight unit. However, this may cause a problem that it is impossible to reduce the thickness of the liquid crystal display.

An object of the present invention is to solve the problems associated with the foregoing prior art and to provide a large-sized thin light guide plate which is high in light use efficiency, and is capable of emitting light with reduced unevenness in luminance and obtaining a so-called convex or bell-shaped brightness distribution, that is, such a distribution that an area around the center of the screen is brighter than the periphery as required of a flat large-screen liquid crystal television.

Another object of the invention is to provide a light guide plate capable of preventing the light use efficiency from being reduced even in cases where polydisperse particles including a mixture of particles with different particle sizes are used as scattering particles to be kneaded and dispersed in the light guide plate as compared to cases where monodisperse particles are used.

Solution to Problems

In order to solve the above problems, the invention provides a light guide plate comprising: a rectangular light exit surface; at least one light incidence surface which is provided on at least one end side of the light exit surface and through which light traveling in a direction substantially parallel to the light exit surface enters; and a rear surface on an opposite side from the light exit surface, scattering particles being dispersed in the light guide plate, wherein the scattering particles are polydisperse particles including a mixture of particles with different particle sizes, wherein the light guide plate includes two or more layers superposed on each other in a direction substantially perpendicular to the light exit surface and containing the scattering particles at different particle concentrations, wherein the two or more layers include at least, a first layer disposed on a side closer to the light exit surface and having a particle concentration Npo and a second layer disposed on a side closer to the rear surface than the first layer and having a particle concentration Npr, and Npo and Npr satisfy a relationship expressed by Npo<Npr, wherein a cross section in a direction perpendicular to the at least one light incidence surface extending from the at least one light incidence surface toward a central portion of the light exit surface has a concave shape toward a light exit surface side, and wherein a combined particle concentration in each portion of the light guide plate is changed by changing a thickness of the first layer and a thickness of the second layer in the direction substantially perpendicular to the light exit surface.

In the cross section in the direction perpendicular to the at least one light incidence surface extending from the at least one light incidence surface toward the central portion of the light exit surface, an interface between the first layer and the second layer preferably has a convex shape toward the light exit surface at the central portion of the light exit surface.

Preferably, the combined particle concentration is determined using a reverse-biased concentration and, according to the combined particle concentration, the thickness of the second layer continuously changes so as to decrease from the central portion of the light exit surface toward the at least one light incidence surface and continuously changes so as to increase toward the at least one light incidence surface near the at least one light incidence surface.

Preferably, the light exit surface and the rear surface have flat shapes and the concave shape on the light exit surface side is formed by warping the light guide plate on a rear surface side.

In order to solve the above problems, the invention also provides a light guide plate comprising: a rectangular light exit surface; at least one light incidence surface which is provided on at least one end side of the light exit surface and through which light traveling in a direction substantially parallel to the light exit surface enters; a rear surface provided on an opposite side from the light exit surface; and scattering particles dispersed in the light guide plate, wherein the scattering particles are polydisperse particles including a mixture of particles with different particle sizes, wherein the light guide plate includes two or more layers superposed on each other in a direction substantially perpendicular to the light exit surface and containing the scattering particles at different particle concentrations, wherein the two or more layers include at least, a first layer disposed on a side closer to the light exit surface and having a particle concentration Npo and a second layer disposed on a side closer to the rear surface than the first layer and having a particle concentration Npr, and Npo and Npr satisfy a relationship expressed by Npo<Npr, and wherein a thickness of the second layer once changes so as to decrease with increasing distance from the at least one light incidence surface and then continuously changes so as to increase.

The second layer preferably has a maximum thickness at the central portion of a light exit surface.

Preferably, an interface between the first layer and the second layer is flat, the second layer has a convex shape toward the opposite side from the light exit surface, and the light guide plate further includes a third layer having a concave shape toward the light exit surface side and corresponding to the convex shape of the second layer.

An interface between the first layer and the second layer is preferably a joined surface of a concave curved surface toward the light exit surface on a side closer to one of the at least one light incidence surface and a convex curved surface toward the light exit surface on a side opposite from the one of the at least one light incidence surfaces.

An interface between the first layer and the second layer preferably includes a concave curved surface toward the light exit surface on a side closer to one of the at least one light incidence surface, a parallel flat surface parallel to the light exit surface on a side opposite from the one of the at least one light incidence surface, and a convex curved surface toward the light exit surface joining the concave curved surface to the parallel flat surface.

An interface between the first layer and the second layer preferably includes a concave curved surface toward the light exit surface on a side closer to one of the at least one light incidence surface, an inclined flat surface inclined with respect to the light exit surface on a side opposite from the one of the at least one light incidence surface, and a convex curved surface toward the light exit surface joining the concave curved surface to the inclined flat surface.

An interface between the first layer and the second layer preferably includes a concave curved surface toward the light exit surface on a side closer to one of the at least one light incidence surface, a convex curved surface toward the light exit surface on a side opposite from the one of the at least one light incidence surface, and an inclined flat surface inclined with respect to the light exit surface and joining the concave curved surface to the convex curved surface.

Npo and Npr preferably fall within ranges satisfying Npo=0 wt % and 0.01 wt %<Npr<0.4 wt %.

Npo and Npr preferably fall within ranges satisfying 0 wt %<Npo<0.15 wt % and Npo<Npr<0.4 wt %.

The rear surface is preferably a flat surface parallel to the light exit surface.

The rear surface is preferably a surface inclined in a direction away from the light exit surface with increasing distance from the at least one light incidence surface.

Preferably, the cross section in the direction perpendicular to the at least one light incidence surface extending from the at least one light incidence surface toward the central portion of the light exit surface also has a concave shape on a rear surface side.

Preferably, the at least one light incidence surface is provided on one end side of the light exit surface.

The at least one light incidence surface preferably comprises two light incidence surfaces provided on opposing two end sides of the light exit surface.

In the direction perpendicular to the at least one light incidence surface of the light guide plate, the region from the at least one light incidence surface to the distance Lnpi is preferably a light entrance portion which has a different particle concentration from that of the other region.

The width Lnpi of the light entrance portion preferably satisfies the relationship expressed by 0 mm<Lnp≤20 mm.

In the case of suppressing the streaky unevenness in the vicinity of the at least one light incidence surface of the light guide plate, Npi>Npr or Npi>Npo preferably holds where Npi is the particle density of the scattering particles dispersed in the light entrance portion.

In the case of suppressing the bright line unevenness in the vicinity of the at least one light incidence surface of the light guide plate, Npi<Npr or Npi<Npo preferably holds where Npi is the particle density of the scattering particles dispersed in the light entrance portion.

In order to solve the above problems, the invention further provides a planar lighting device comprising: the light guide plate described above, and an optical member including at least one microlens sheet on the side closer to the light exit surface of the light guide plate.

In order to solve the above problems, the invention further provides a liquid crystal display comprising: the planar lighting device described above, and a liquid crystal display panel on the side closer to a light exit surface of the planer lighting device.

Advantageous Effects of Invention

The invention enables a thin design, high light use efficiency and emission of light with reduced unevenness in luminance, and is capable of obtaining a so-called convex or bell-shaped brightness distribution, that is, such a distribution that an area around the center of the screen is brighter than the periphery as required of a flat large-screen liquid crystal television.

According to the invention, the light guide plate is not likely to warp on the light exit surface side and therefore the distance between the liquid crystal panel and the light guide plate can be reduced to enable further reduction in thickness.

In addition, since the light exit surface has a concave shape, it is possible to increase the size of the light incidence surface and enhance the efficiency of light entering from the light source as compared to the flat light guide plate having the same average thickness. If the light incidence surface is the same in size, the light guide plate can be reduced in weight more than the flat light guide plate.

BRIEF DESCRIPTION OF DRAWINGS

FIG. 4A is a perspective view showing the schematic configuration of a light source of the planar lighting device shown in FIGS. 1 and 2, and FIG. 4B is an enlarged schematic perspective view showing one of LEDs forming the light source shown in FIG. 4A.

FIGS. 7A and 7B are graphs each showing the distribution of the particle size of the scattering particles that may be used in the light guide plate of the invention.

FIG. 19 is a graph showing the measurement results of the illuminance distribution of light emitted through the light exit surface of the light guide plate.

FIG. 20 is a graph showing the measurement results of the illuminance distribution of light emitted through the light exit surface of the light guide plate.

DESCRIPTION OF EMBODIMENTS

A planar lighting device using a light guide plate according to the invention will be described below in detail with reference to preferred embodiments shown in the attached drawings.

Figure 1:
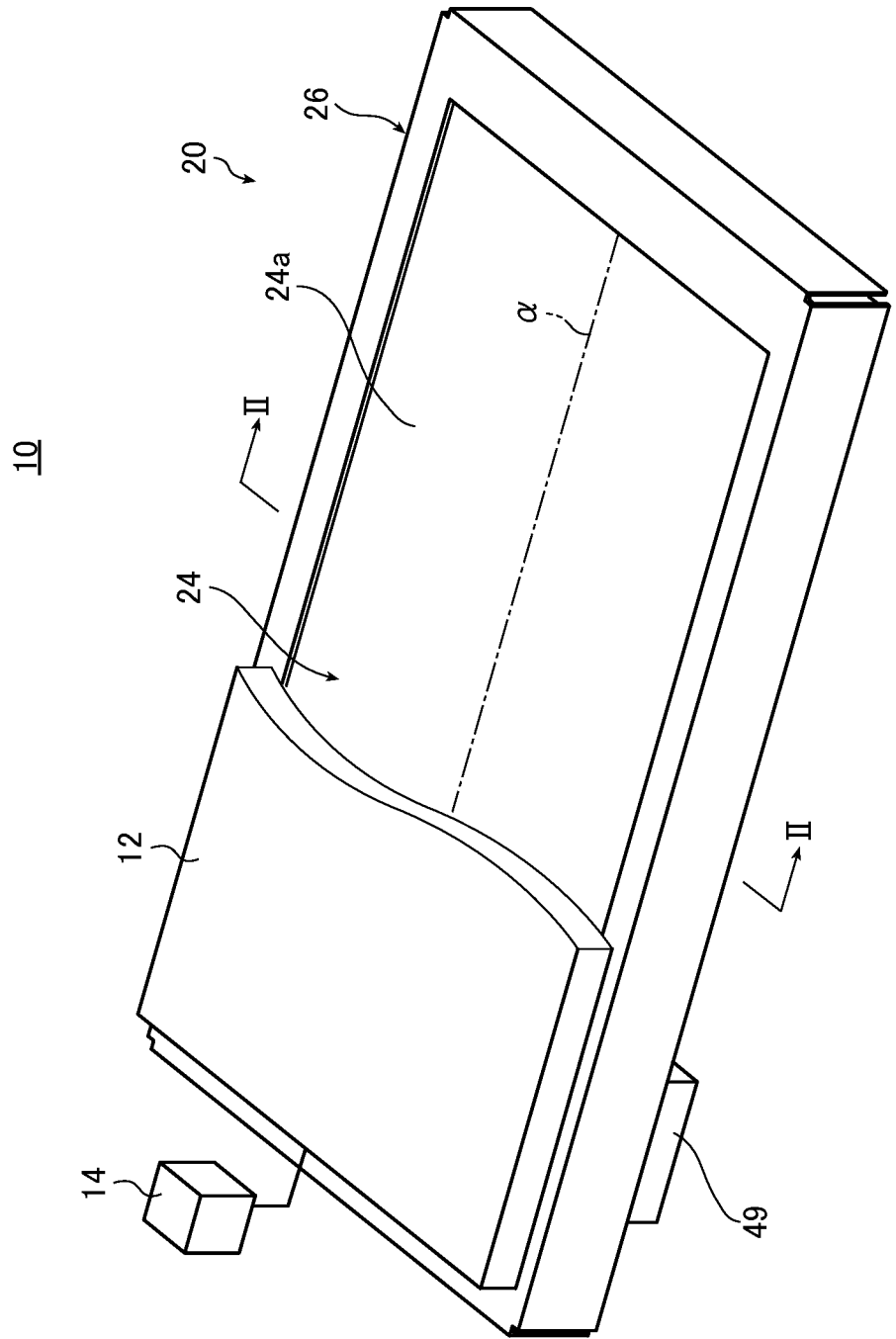
FIG. 1 is a schematic perspective view showing an embodiment of a liquid crystal display provided with a planar lighting device using a light guide plate according to the invention.
Figure 2:
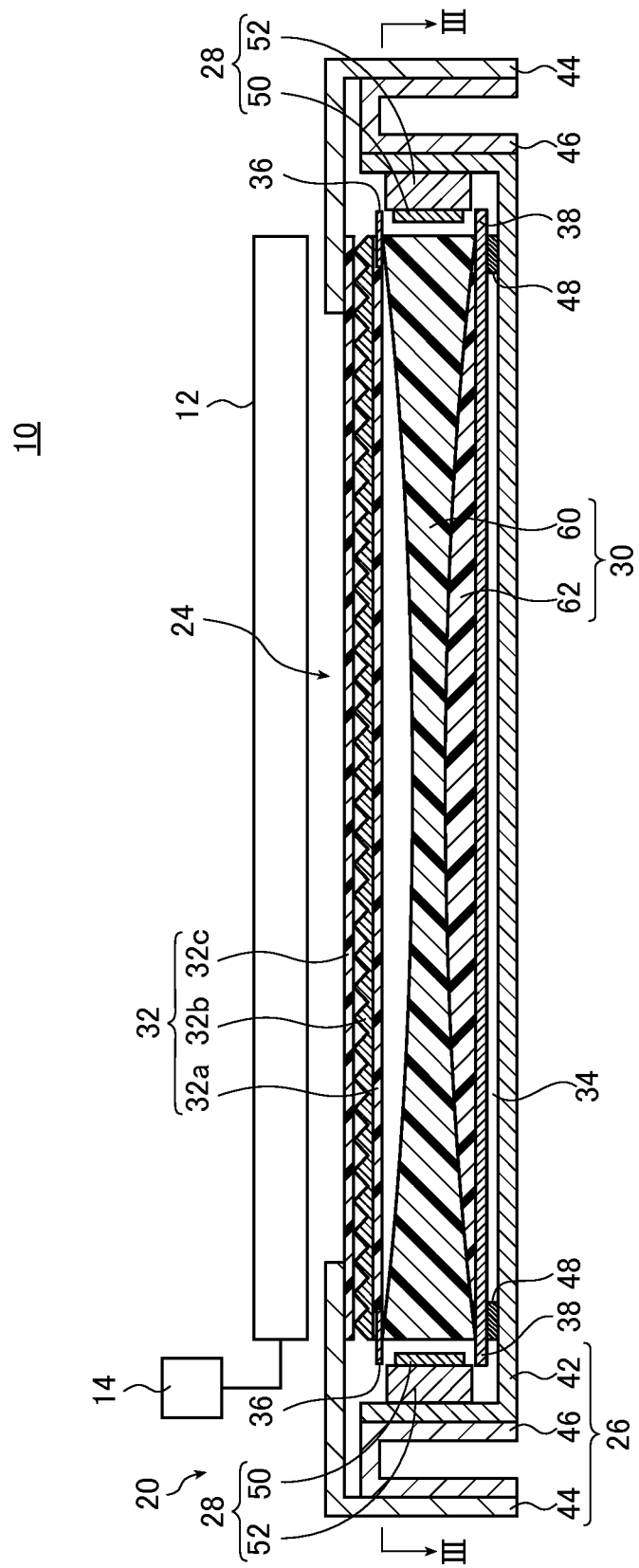
FIG. 2 is a cross-sectional view of the liquid crystal display shown in FIG. 1 taken along line II-II.

FIG. 1 is a perspective view schematically showing a liquid crystal display provided with the planar lighting device using the light guide plate according to the invention and FIG. 2 is a cross-sectional view of the liquid crystal display shown in FIG. 1 taken along line II-II.

Figure 3A:
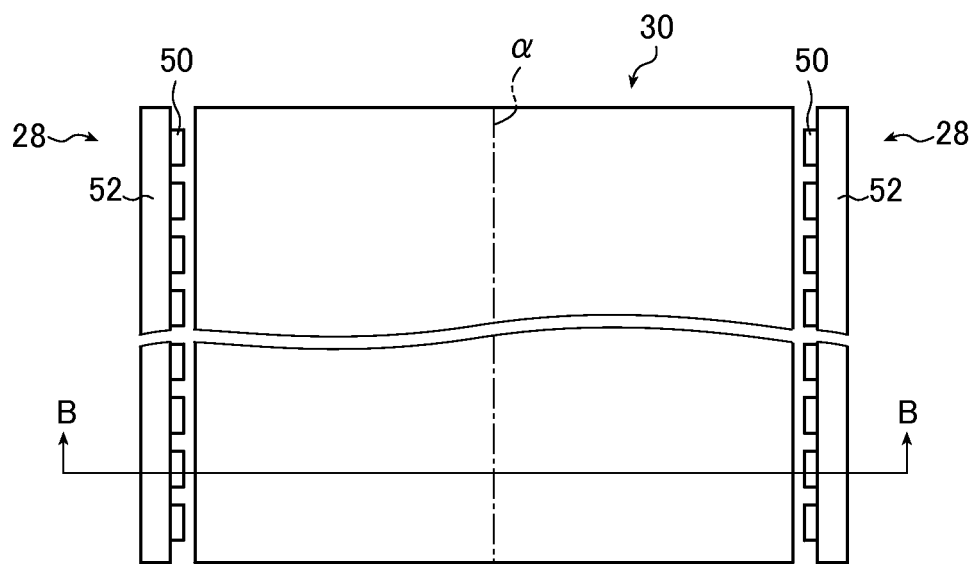
FIG. 3A is a view of the planar lighting device shown in FIG. 2 taken along line III-III and FIG. 3B is a cross sectional view of FIG. 3A taken along line B-B.
Figure 3B:
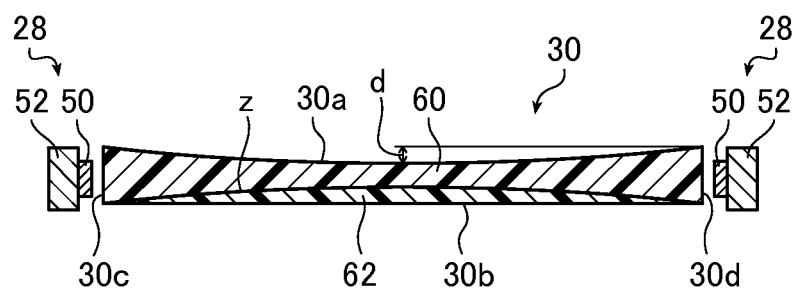

FIG. 3A is a view of the planar lighting device (also referred to below as "backlight unit") shown in FIG. 2 taken along line III-III and FIG. 3B is a cross-sectional view of FIG. 3A taken along line B-B.

A liquid crystal display 10 comprises a backlight unit 20, a liquid crystal display panel 12 disposed on the side of the backlight unit 20 closer to the light exit surface, and a drive unit 14 for driving the liquid crystal display panel 12. In FIG. 1, part of the liquid crystal display panel 12 is not shown to illustrate the configuration of the backlight unit.

In the liquid crystal display panel 12, an electric field is partially applied to liquid crystal molecules previously arranged in a specified direction to thereby change the orientation of the molecules. The resultant changes in refractive index having occurred in the liquid crystal cells are used to display characters, figures, images and the like on the surface of the liquid crystal display panel 12.

The drive unit 14 applies a voltage to transparent electrodes in the liquid crystal display panel 12 to change the orientation of the liquid crystal molecules, thereby controlling the transmittance of light passing through the liquid crystal display panel 12.

The backlight unit 20 is a lighting device for illuminating the whole surface of the liquid crystal display panel 12 from behind the liquid crystal display panel 12 and comprises a light exit surface 24a of which the shape is substantially the same as an image display surface of the liquid crystal display panel 12.

As shown in FIGS. 1, 2, 3A and 3B, the backlight unit 20 according to this embodiment comprises a lighting device main body 24 having two light sources 28, a light guide plate 30 and an optical member unit 32, and a housing 26 having a lower housing 42, an upper housing 44, bent members 46 and support members 48. As shown in FIG. 1, a power unit casing 49 containing a plurality of power supplies for supplying the light source 28 with electric power is provided on the back side of the lower housing 42 of the housing 26.

Components constituting the backlight unit 20 will be described below.

The lighting device main body 24 comprises the light sources 28 for emitting light, the light guide plate 30 for emitting the light from the light sources 28 as planar light, and the optical member unit 32 for scattering and diffusing the light emitted from the light guide plate 30 to further reduce the unevenness of the light.

First, the light sources 28 will be described.

FIG. 4A is a schematic perspective view schematically showing the configuration of the light source 28 of the backlight unit 20 shown in FIGS. 1 and 2. FIG. 4B is an enlarged schematic perspective view showing only one LED chip of the light source 28 shown in FIG. 4A.

As shown in FIG. 4A, the light source 28 comprises a plurality of light emitting diode chips (referred to below as "LED chips") 50 and a light source support 52.

The LED chip 50 is a chip of a light emitting diode emitting blue light, which has a phosphor applied on the surface thereof. It has a light-emitting face 58 with a predetermined area through which white light is emitted.

Specifically, when blue light emitted through the surface of the light emitting diode of the LED chip 50 passes through the phosphor, the phosphor emits fluorescence. Thus, the blue light emitted from the light emitting diode is combined with the light emitted as a result of the fluorescence of the phosphor to produce white light, which is emitted from the LED chip 50.

An example of the LED chip 50 includes a chip obtained by applying a YAG (yttrium aluminum garnet) phosphor to the surface of a GaN light emitting diode, an InGaN light emitting diode, and the like.

The light source support 52 is a plate member disposed so that one surface thereof faces a light incidence surface 30c or 30d of the light guide plate 30.

The light source support 52 carries the LED chips 50 on its lateral surface facing the light incidence surface (30c or 30d) of the light guide plate 30 so that the LED chips 50 are spaced apart from each other at predetermined intervals. More specifically, the LED chips 50 constituting the light source 28 are arrayed along the longitudinal direction of the first light incidence surface 30c or the second light incidence surface 30d of the light guide plate 30 to be described later, in other words, parallel to a line in which the first light incidence surface 30c or the second light incidence surface 30d meets a light exit surface 30a, and are secured onto the light source support 52.

The light source support 52 is formed of a metal having high heat conductivity such as copper or aluminum and also serves as a heat sink which absorbs heat generated from the LED chips 50 and releases the generated heat to the outside. The light source support 52 may be equipped with fins capable of increasing the surface area and the heat dissipation effect or heat pipes for transferring heat to a heat dissipating member.

As shown in FIG. 4B, the LED chips 50 according to this embodiment each have such a rectangular shape that the sides in a direction perpendicular to the direction in which the LED chips 50 are arrayed are shorter than the sides lying in the direction in which the LED chips 50 are arrayed, that is, the sides lying in the direction of thickness of the light guide plate 30 to be described later (the direction perpendicular to the light exit surface 30a) are shorter sides. In other words, the LED chips 50 each have a shape satisfying $b>a$ where "a" denotes the length of the side in a direction perpendicular to the light exit surface 30a of the light guide plate 30 and "b" denotes the length of the side in the array direction. Now, given "q" as the distance by which the arrayed LED chips 50 are spaced apart from each other, then $q>b$ holds. Thus, the length "a" of the side of the LED chips 50 perpendicular to the light exit surface 30a of the light guide plate 30, the length "b" of the side in the array direction, and the distance "q" by which the LED chips 50 are spaced apart from each other preferably have a relationship satisfying $q>b>a$.

The LED chips 50 each having a rectangular shape allows a thinner design of the light source to be achieved while keeping the output of a large amount of light. A thinner light source 28, in turn, permits the reduction of the thickness of the backlight unit. Further, the number of LED chips that need to be arranged can be reduced.

While the LED chips 50 each preferably have a rectangular shape with the shorter sides lying in the direction of the thickness of the light guide plate 30 for a thinner design of the light source 28, the invention is not limited thereto and LED chips having various shapes including a square shape, a circular shape, a polygonal shape and an elliptical shape may be used.

Next, the light guide plate 30 will be described.

Figure 5:
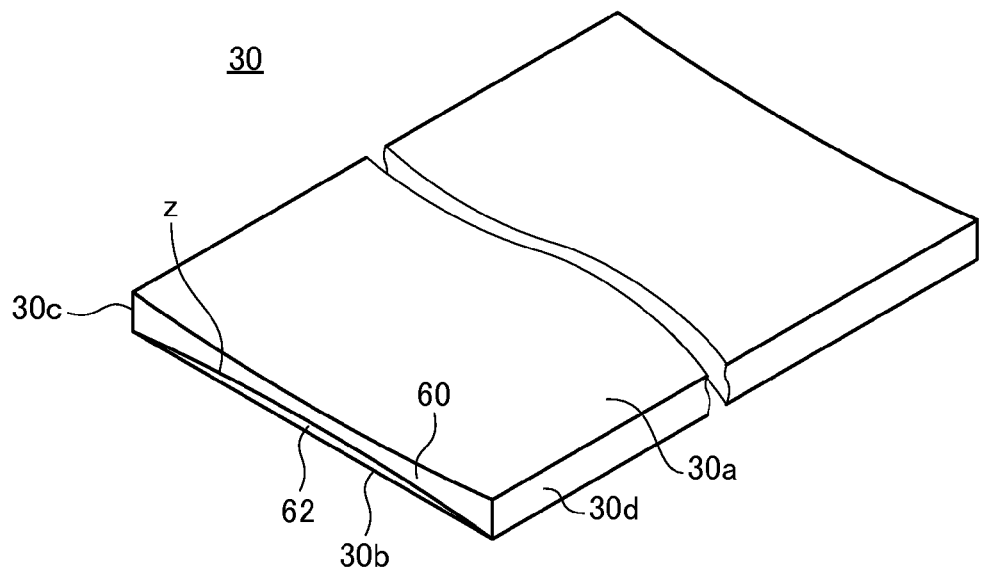
FIG. 5 is a schematic perspective view showing the shape of the light guide plate shown in FIG. 3A.

FIG. 5 is a schematic perspective view showing the shape of the light guide plate.

As shown in FIGS. 2, 3 and 5, the light guide plate 30 includes the rectangular light exit surface 30a; the two light incidence surfaces (the first light incidence surface 30c and the second light incidence surface 30d) formed at both ends on the longer sides of the light exit surface 30a and substantially perpendicular to the light exit surface 30a; and a flat rear surface 30b located on the opposite side from the light exit surface 30a, that is, on the back side of the light guide plate 30.

The thickness of the light guide plate 30 decreases from the first light incidence surface 30c and the second light incidence surface 30d toward the center (of the light exit surface 30a) of the light guide plate and the light guide plate 30 has such a concave shape that the light guide plate 30 is the thinnest in the central portion corresponding to the bisector α and the thickest at the two light incidence surfaces (the first light incidence surface 30c and the second light incidence surface 30d) on both ends. In other words, the light exit surface 30a has a concave shape and is symmetrical with respect to the central axis that is the bisector α (see FIGS. 1 and 3) connecting the centers of the shorter sides of the light exit surface 30a.

That is, the light exit surface 30a has such a concave shape that the cut plane when the light guide plate is cut in its thickness direction at a line which connects the first and second light incidence surfaces 30c and 30d and is perpendicular to the respective light incidence surfaces is symmetrical with respect to the central line which passes through the midpoint of the perpendicular line and makes a right angle with the perpendicular line on the cut plane (the line which passes through the midpoint of the perpendicular line on the cut plane and is parallel to the respective light incidence surfaces).

The two light sources 28 mentioned above are disposed so as to face the first light incidence surface 30c and the second light incidence surface 30d of the light guide plate 30, respectively. In this embodiment, the light-emitting face 58 of each LED chip 50 in the light sources 28 has substantially the same length as the first light incidence surface 30c and the second light incidence surface 30d in the direction substantially perpendicular to the light exit surface 30a.

Thus, the backlight unit 20 has the two light sources 28 disposed so as to sandwich the light guide plate 30 therebetween. In other words, the light guide plate 30 is disposed between the two light sources 28 so that the former faces the latter at a predetermined distance from each other.

The light guide plate 30 is formed by kneading and dispersing scattering particles for light scattering into a transparent resin. Exemplary materials of the transparent resin that may be used for the light guide plate 30 include optically transparent resins such as PET (polyethylene terephthalate), PP (polypropylene), PC (polycarbonate), PMMA (polymethyl methacrylate), benzyl methacrylate, MS resin, and COP (cycloolefin polymer). Silicone fine particles (e.g., TOSPEARL), silica, zirconia and a dielectric polymer may be used for the scattering particles to be kneaded and dispersed in the light guide plate 30.

The shape of the cross section formed by cutting the light guide plate 30 in its thickness direction at the line which connects the first and second light incidence surfaces 30c and 30d and is perpendicular to the respective light incidence surfaces is substantially rectangular and the light exit surface 30a has the concave shape. The light guide plate 30 is of a two-layer structure including a first layer 60 on the side closer to the light exit surface 30a and a second layer 62 on the side closer to the rear surface 30b. An interface z between the first layer 60 and the second layer 62 is convex toward the side closer to the light exit surface 30a and has a substantially arc shape.

The first layer 60 has a sectional region surrounded by the light exit surface 30a, the first light incidence surface 30c, the second light incidence surface 30d and the interface z, and the second layer 62 is a layer adjacent to the first layer on the side closer to the rear surface 30b and has a sectional region surrounded by the interface z and the rear surface 30b.

The light exit surface 30a has such a concave shape as to draw an arc of a circle with a radius of curvature R of 75,000 mm in the case of, for example, a 42-inch screen size. Then, the difference between the central portion of the light exit surface 30a corresponding to the bisector α and the end portions of the first and second light incidence surfaces 30c and 30d on the side closer to the light exit surface 30a, that is, the height d of the recess in the concave light exit surface 30a is 0.44 mm.

The light exit surface is preferably recessed with a radius of curvature R of 35,000 mm to 1,850,000 mm in terms of the balance between the optical properties and the mechanical properties (strength), and the height d of the recess is preferably in a range of 0.1 mm to 0.6 mm. Table 1 shows examples of the length between the light incidence surfaces 30c and 30d, the height d of the recess, the radius of curvature R, and the length of the chord of the concave arc in each screen size. The concave shape may be a circular or elliptical arc shape or an arc shape formed by combining a circle and an ellipse. An alternative shape is also possible in which an arc is used in the central portion of the light exit surface 30a and the light exit surface 30a is tapered toward the first and second light incidence surfaces 30c and 30d and connected thereto.

TABLE 1

| Screen size [inch] | Length between light incidence surfaces [mm] | Recess height d [mm] | Radius of curvature R [mm] | Arc chord length [mm] |
|---|---|---|---|---|
| 32 | 413 | 0.1 | 170000 | 373 |
|    |     | 0.5 | 35000  |     |
| 37 | 480 | 0.1 | 240000 | 440 |
|    |     | 0.48 | 50000 |     |
| 46 | 593 | 0.1 | 380000 | 553 |
|    |     | 0.51 | 75000 |     |
| 65 | 829 | 0.1 | 750000 | 789 |
|    |     | 0.49 | 160000 |    |
| 100 | 1265 | 0.1 | 1850000 | 1225 |
|    |     | 0.51 | 370000 |    |

Although the light guide plate 30 is divided into the first layer 60 and the second layer 62 by the interface z, the first layer 60 and the second layer 62 contain the same scattering particles dispersed in the same transparent resin and have an integrated structure, the only difference being the particle concentration. That is, the light guide plate 30 has different particle concentrations in the respective regions on both sides of the interface z but the interface z is a virtual face and the first layer 60 is integrated with the second layer 62.

Now, the particle concentration of the scattering particles in the first layer 60 and that of the scattering particles in the second layer 62 are denoted by Npo and Npr, respectively. Then, Npo and Npr have a relationship expressed by Npo<Npr. Thus, in the light guide plate 30, the second layer on the side closer to the rear surface 30b contains the scattering particles at a higher particle concentration than the first layer on the side closer to the light exit surface 30a.

By incorporating the scattering particles so that the particle concentration is different from region to region inside the light guide plate 30, illumination light with reduced unevenness in luminance and illuminance having a luminance distribution (illuminance distribution) which is high in the middle can be emitted through the light exit surface 30a. The light guide plate 30 as described above may be manufactured using an extrusion molding method or an injection molding method.

In the light guide plate of the invention, the luminance distribution and the illuminance distribution basically have similar tendencies and so do the luminance unevenness and the illuminance unevenness. In other words, the portions where the luminance unevenness appears are likewise uneven in illuminance and the luminance distribution and the illuminance distribution have similar tendencies.

Polydisperse particles including a mixture of particles with different particle sizes are used as scattering particles to be kneaded and dispersed in the light guide plate 30.

In general, monodisperse particles which are uniform in particle size are more preferably used as the scattering particles to be kneaded and dispersed in the light guide plate than polydisperse particles because light is scattered more uniformly inside the light guide plate, the light use efficiency can be improved, and the color unevenness is less likely to occur. However, classification of the particles is necessary to obtain the monodisperse particles, which may increase costs.

In contrast, even in cases where polydisperse particles including a mixture of particles with different particle sizes are used, the invention can prevent the light use efficiency from being reduced by incorporating the scattering particles at particle concentrations which are different from region to region inside the light guide plate 30. Therefore, classification of the scattering particles is not necessary, which enables cost reduction.

In the invention, particles satisfying a Gaussian distribution in which the distribution of the particle size with respect to the central particle size falls within a range of ±0.5 μm when calculated as 3σ, where σ represents the standard deviation, are referred to as monodisperse particles, and the other particles are referred to as polydisperse particles.

Even if the polydisperse particles are used as the scattering particles to be kneaded and dispersed in the light guide plate, the color unevenness of light can also be adjusted to the same degree.

The light-extraction efficiency E, that is, the ratio of the intensity I of outgoing light to the intensity $I_o$ of incident light is expressed by the equation:

$$E = I/I_0 \propto \mathrm{EXP}(-\Phi \cdot Np \cdot Lg \cdot Kc)$$

where $\Phi$ is the scattering cross section of the scattering particles, Np is the particle concentration, Lg is the length of the light guide plate in its depth direction, and Kc is the compensation coefficient. In the case of the polydisperse particles, the light-extraction efficiency E can be expressed by the equation:

$$E = I/I_0 \propto \mathrm{EXP}(-(\Sigma \Phi i \cdot Npi) \cdot Lg \cdot Kc)$$

where $\Phi i$ is the scattering cross section corresponding to the ith particle and $Npi$ is the particle concentration. In other words, the light-extraction efficiency E is proportional to the scattering cross section $\Phi$.

The scattering cross section depends on the particle size of the scattering particles and the wavelength of the incident light. Therefore, the scattering cross section and hence the light-extraction efficiency vary with the light wavelength. The light-extraction efficiency varies with the light wavelength to cause color unevenness in the outgoing light.

For example, in cases where, of light of red (R), green (G) and blue (B) colors, blue (B) wavelength light is more likely to be scattered, outgoing light through the light exit surface of the light guide plate gets bluish in the regions near the light incidence surfaces. Therefore, the ratio of the scattering cross sections at the red (R), green (G) and blue (B) wavelengths in the scattering particles to be kneaded and dispersed in the light guide plate is preferably smaller because the color unevenness can be more reduced.

Figure 6:
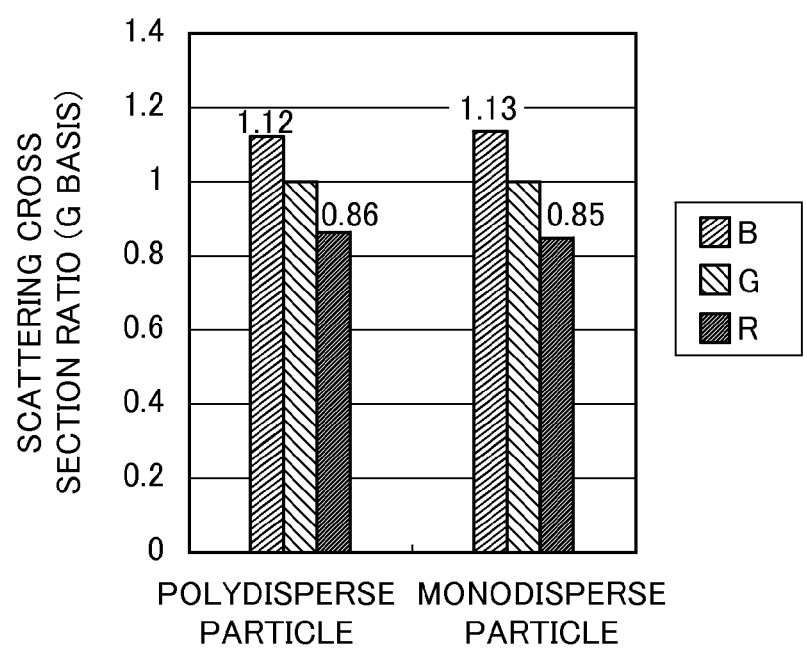
FIG. 6 is a graph showing the comparison of the scattering cross-section of scattering particles.

FIG. 6 is a graph showing the comparison of the scattering cross section at the RGB wavelengths in the monodisperse particles and polydisperse particles with an average particle size of 4.5 μm. In the graph shown in FIG. 6, the scattering cross section is indicated by the ratio based on green (G). FIG. 7A is a graph showing the particle size distribution of the polydisperse particles used in the measurement.

FIG. 6 shows that the ratio of the scattering cross sections at the RGB wavelengths in the polydisperse particles is smaller than that in the monodisperse particles. Therefore, the color unevenness of outgoing light can also be reduced at least to the same degree as that in the monodisperse particles.

In the light guide plate 30 shown in FIG. 2, light emitted from the light sources 28 and allowed to enter the light guide plate 30 through the first light incidence surface 30c and the second light incidence surface 30d is scattered by scatterers (scattering particles) contained inside the light guide plate 30 as it travels through the inside of the light guide plate 30, and is emitted through the light exit surface 30a directly or after having been reflected by the rear surface 30b. Then, part of light may leak through the rear surface 30b but the light which leaked out is then reflected by a reflector 34 disposed on the side of the light guide plate 30 closer to the rear surface 30b to enter the light guide plate 30 again. The reflector 34 will be described later in detail.

The light guide plate 30 has such a shape that the thickness of the second layer 62 in the direction substantially perpendicular to the light exit surface 30a increases with increasing distance from the first light incidence surface 30c or the second light incidence surface 30d, the light sources 28 being disposed at positions opposed thereto. In this way, incident light through the light incidence surfaces 30c and 30d can travel to positions farther from the light incidence surfaces 30c and 30d to increase the size of the light exit surface 30a. Moreover, since incident light through the light incidence surfaces 30c and 30d can be advantageously guided to travel a long distance, a thinner design of the light guide plate 30 is possible.

In addition, by changing the particle concentration inside the light guide plate 30 in two layers including the first layer 60 and the second layer 62 such that the particle concentration in the first layer 60 located on the side closer to the light exit surface 30a is lower than the particle concentration in the second layer 62, the illuminance distribution may be higher in the middle than in the case of a light guide plate having a single particle concentration, (that is, a light guide plate having a uniform concentration on the whole), thus improving the light use efficiency.

Specifically, when the relationship between the particle concentration Npo of the scattering particles in the first layer 60 and the particle concentration Npr of the scattering particles in the second layer 62 satisfies Npo<Npr as in the embodiment under discussion, the combined particle concentration of the scattering particles gradually increases with increasing distance from the light incidence surfaces 30c and 30d toward the center of the light guide plate (toward the center between the two light incidence surfaces). Accordingly, light reflected by the action of the scattering particles toward the light exit surface 30a increases with increasing distance from the light incidence surfaces 30c and 30d, and as a result the illuminance distribution that is high in the middle at a preferable ratio can be obtained. In other words, similar effects to those obtained with a flat light guide plate having a scattering particle concentration distribution in the direction perpendicular to the light incidence surfaces (depth direction) can be achieved. In addition, by adjusting the shape of the interface z, the luminance distribution (scattering particle concentration distribution) can also be arbitrarily set to improve the efficiency to a maximum extent.

The combined particle concentration as used herein denotes a concentration of scattering particles expressed using the amount of scattering particles added or combined in a direction substantially perpendicular to the light exit surface at a position spaced apart from one light incidence surface toward the other on the assumption that the light guide plate is a flat plate having the thickness at the light incidence surfaces throughout the light guide plate. In other words, the combined particle concentration denotes a quantity per unit volume of scattering particles or a weight percentage with respect to the base material of scattering particles added in a direction substantially perpendicular to the light exit surface at a position spaced apart from the light incidence surface on the assumption that the light guide plate is a flat light guide plate which has the thickness at the light incidence surfaces throughout the light guide plate and in which the concentration is the same.

Further, the light use efficiency may also be substantially as high as or higher than that obtained with a light guide plate having a single particle concentration. Thus, according to the invention, the illuminance distribution and the luminance distribution can be made higher in the middle than the light guide plate having a single particle concentration while keeping the light use efficiency at a level as high as the light guide plate having a single particle concentration. In addition, since the particle concentration of the layer on the side closer to the light exit surface is reduced, the total amount of the scattering particles used can be reduced, thus leading to cost reduction.

Further, the particle concentration Npo of the scattering particles in the first layer 60 and the particle concentration Npr of the scattering particles in the second layer 62 preferably satisfy the relationships of 0 wt %<Npo<0.15 wt % and Npo<Npr<0.4 wt %.

If the first layer 60 and the second layer 62 of the light guide plate 30 satisfy the above relationships, the light guide plate 30 can guide the incident light to the inside (center) of the light guide plate 30 without scattering it so much in the first layer 60 having a lower particle concentration, and the light is scattered by the second layer having a higher particle concentration as it approaches the center of the light guide plate, thus enabling the amount of light emitted through the light exit surface 30a to be increased. In brief, the illuminance distribution which is high in the middle at a preferable ratio can be obtained while further enhancing the light use efficiency.

The particle concentration [wt %] as used herein denotes a ratio of the weight of the scattering particles to the weight of the base material.

Further, the particle concentration Npo of the scattering particles in the first layer 60 and the particle concentration Npr of the scattering particles in the second layer 62 preferably satisfy the relationships of Npo=0 wt % and 0.01 wt %<Npr<0.4 wt %. In other words, the light guide plate may be configured such that the scattering particles are not dispersed in the first layer 60 by kneading to guide incident light deep into the light guide plate 30, and the scattering particles are only kneaded and dispersed in the second layer 62 to scatter the light more as it comes closer to the center of the light guide plate, thereby increasing the amount of light emitted through the light exit surface 30a.

Since the first layer 60 and the second layer 62 of the light guide plate 30 satisfy the above relationships, the illuminance distribution which is high in the middle at a preferable ratio can be obtained while further enhancing the light use efficiency.

The thickness of the light guide plate of the invention is not particularly limited. The light guide plate may be several millimeters in thickness or may be a so-called light guide sheet which is a film with a thickness of 1 mm or less. A film-like light guide plate having two layers which contain scattering particles kneaded and dispersed therein at different particle concentrations may be produced by a method which involves forming as the first layer a base film containing scattering particles by extrusion molding or other process, applying a monomer resin liquid (transparent resin liquid) having scattering particles dispersed therein to the formed base film, and irradiating the base film with ultraviolet light or visible light to cure the monomer resin liquid to thereby form the second layer having a desired particle concentration, thus producing a film-like light guide plate. Alternatively, the film-like light guide plate may be produced by two-layer extrusion molding.

Also in cases where the light guide plate is a film-like light guide sheet with a thickness of 1 mm or less, formation of the light guide plate in two layers enables the illuminance distribution which is high in the middle at a preferable ratio to be obtained while further enhancing the light use efficiency.

Next, the optical member unit 32 will be described.

The optical member unit 32 is provided to reduce the luminance unevenness and illuminance unevenness of illumination light emitted through the light exit surface 30a of the light guide plate 30 before emitting the light through the light exit surface 24a of the lighting device main body 24. As shown in FIG. 2, the optical member unit 32 comprises a diffusion sheet 32a for diffusing the illumination light emitted through the light exit surface 30a of the light guide plate 30 to reduce the luminance unevenness and illuminance unevenness; a prism sheet 32b having microprism arrays formed thereon parallel to the lines where the light exit surface 30a and the light incidence surfaces 30c, 30d meet; and a diffusion sheet 32c for diffusing the illumination light emitted through the prism sheet 32b to reduce the luminance unevenness and the illuminance unevenness.

There is no particular limitation on the diffusion sheets 32a and 32c and the prism sheet 32b and known diffusion sheets and prism sheets may be used. For example, use may be made of the diffusion sheets and the prism sheets disclosed in paragraphs [0028] through [0033] of commonly assigned JP 2005-234397 A.

While the optical member unit in the embodiment under discussion comprises the two diffusion sheets 32a and 32c and the prism sheet 32b disposed between the two diffusion sheets, there is no particular limitation on the order in which the prism sheet and the diffusion sheets are arranged or the number of the sheets to be used. The materials of the prism sheet and the diffusion sheets are also not particularly limited, and use may be made of various optical members, as long as they can further reduce the unevenness in luminance and illuminance of the illumination light emitted through the light exit surface 30a of the light guide plate 30.

For example, the optical members used in addition to or instead of the above-described diffusion sheets and prism sheet may be transmittance adjusting members in which a large number of transmittance adjusters consisting of diffusion reflectors are disposed according to the luminance unevenness and the illuminance unevenness. Further, the optical member unit may be of a two-layer structure including one prism sheet and one diffusion sheet or including two diffusion sheets only.

In the invention, the optical member unit preferably has at least one microlens sheet.

Figure 8A:
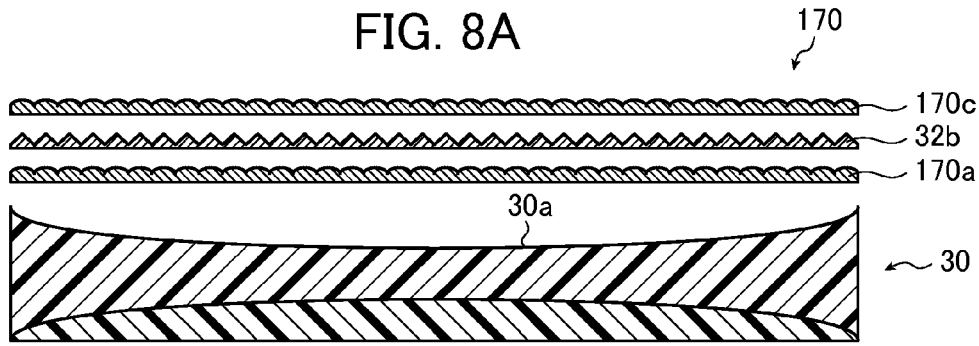
FIGS. 8A and 8B are schematic cross-sectional views showing other examples of an optical member unit that may be used in the backlight unit of the invention.

For example, an optical member unit 170 as shown in FIG. 8A may be used which includes a microlens sheet 170a having microlens arrays formed thereon parallel to the lines where the light exit surface 30a and the light incidence surfaces 30c, 30d meet, a prism sheet 32b and a microlens sheet 170c.

Figure 8B:
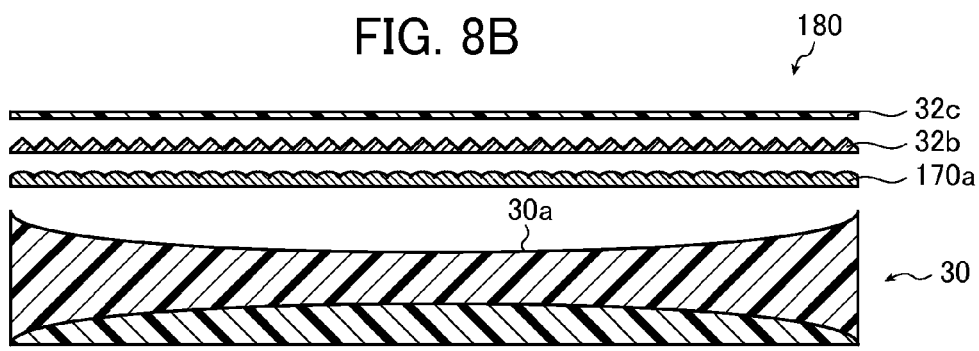

Alternatively, an optical member unit 180 as shown in FIG. 8B may be used which includes a microlens sheet 170a, a prism sheet 32b and a diffusion sheet 32c.

By using an optical member unit including at least one microlens sheet in combination with a light guide plate containing scattering particles, the front luminance of the backlight unit is improved to enhance the light use efficiency.

In the light guide plate including scattering particles kneaded and dispersed therein, incident light through the light incidence surface is scattered by the scattering particles inside the light guide plate and is then emitted through the light exit surface. Light is scattered forward by the scattering particles and therefore, of all the outgoing light, the ratio of outgoing light through the light exit surface in the front direction is reduced as compared to other types such as a type in which light is scattered by printing dots on the light guide plate.

In contrast, the optical member unit combined with the light guide plate containing the scattering particles is configured to include at least one microlens sheet, which enables light emitted in a direction other than the front side to be guided to the front direction to improve the front luminance.

Next, the reflector 34 of the lighting device main body 24 will be described.

The reflector 34 is provided to reflect light leaking through the rear surface 30b of the light guide plate 30 back into the light guide plate 30 and helps enhance the light use efficiency. The reflector 34 has a shape corresponding to the rear surface 30b of the light guide plate 30 and is formed so as to cover the rear surface 30b. In this embodiment, the reflector 34 is formed into a shape contouring the profile of the rear surface 30b of the light guide plate 30 having a flat plane, that is, having a linear shape in cross section as shown in FIG. 2.

The reflector 34 may be formed of any material, as long as it can reflect light leaking through the rear surface 30b of the light guide plate 30. The reflector 34 may be formed, for example, of a resin sheet produced by kneading a filler with PET or PP (polypropylene) and then drawing the resultant mixture to form voids therein for increased reflectance; a sheet with a specular surface formed by, for example, aluminum vapor deposition on the surface of a transparent or white resin sheet; a metal foil such as an aluminum foil or a resin sheet carrying a metal foil; or a thin metal sheet having a sufficient reflectivity on the surface.

Upper light guide reflectors 36 are disposed between the light guide plate 30 and the diffusion sheet 32a, i.e., on the side of the light guide plate 30 closer to the light exit surface 30a, so as to cover the light sources 28 and the end portions of the light exit surface 30a of the light guide plate 30 (i.e., the end portion on the side closer to the first light incidence surface 30c and the end portion on the side closer to the second light incidence surface 30d). In other words, each upper light guide reflector 36 is disposed so as to cover an area extending from part of the light exit surface 30a of the light guide plate 30 to part of the light source support 52 of the light source 28 in a direction parallel to the direction of the optical axis. Briefly, the two upper light guide reflectors 36 are disposed at both end portions of the light guide plate 30, respectively.

By thus providing the upper light guide reflectors 36, light emitted from the light sources 28 can be prevented from failing to enter the light guide plate 30 and leaking toward the light exit surface 30a.

Thus, light emitted from the light sources 28 can efficiently enter the light guide plate 30 through the first light incidence surface 30c and the second light incidence surface 30d of the light guide plate 30 to enhance the light use efficiency.

Lower light guide reflectors 38 are disposed on the side of the light guide plate 30 closer to the rear surface 30b so as to cover part of the light sources 28. The ends of the lower light guide reflectors 38 closer to the center of the light guide plate 30 are connected to the reflector 34.

The upper light guide reflectors 36 and the lower light guide reflectors 38 may be formed of any of the above-mentioned various materials used to form the reflector 34.

By providing the lower light guide reflectors 38, light emitted from the light sources 28 can be prevented from failing to enter the light guide plate 30 and leaking toward the rear surface 30b of the light guide plate 30.

Thus, light emitted from the light sources 28 can efficiently enter the light guide plate 30 through the first light incidence surface 30c and the second light incidence surface 30d of the light guide plate 30 to enhance the light use efficiency.

While the reflector 34 is connected to the lower light guide reflectors 38 in the embodiment under discussion, this is not the sole case and they may be used as separate members.

The shapes and the widths of the upper light guide reflectors 36 and the lower light guide reflectors 38 are not particularly limited as long as light emitted from the light sources 28 can be reflected toward and allowed to enter through the first light incidence surface 30c or the second light incidence surface 30d and the light having entered the light guide plate 30 can be guided to the central side of the light guide plate 30.

In the embodiment under discussion, the upper light guide reflectors 36 are disposed between the light guide plate 30 and the diffusion sheet 32a. However, the upper light guide reflectors 36 may be disposed at any position without particular limitation. It may be disposed between the sheet members constituting the optical member unit 32 or between the optical member unit 32 and the upper housing 44.

Next, the housing 26 will be described.

As shown in FIG. 2, the housing 26 accommodates and supports the lighting device main body 24 and holds and secures the lighting device main body 24 from the side closer to the light exit surface 24a and the side closer to the rear surface 30b of the light guide plate 30. The housing 26 comprises the lower housing 42, the upper housing 44, the bent members 46 and the support members 48.

The lower housing 42 is open at the top and has a shape formed by a bottom section and lateral sections provided upright on the four sides of the bottom section. In brief, it is substantially in the shape of a rectangular box open on one side. As shown in FIG. 2, the lower housing 42 supports the lighting device main body 24 placed therein from above on the bottom section and the lateral sections and covers the faces of the lighting device main body 24 except the light exit surface 24a, i.e., the face opposite from the light exit surface 24a of the lighting device main body 24 (rear surface) and the lateral faces.

The upper housing 44 has the shape of a rectangular box; it has at the top a rectangular opening which is smaller than the rectangular light exit surface 24a of the lighting device main body 24 and is open at the bottom.

As shown in FIG. 2, the upper housing 44 is placed from above the lighting device main body 24 and the lower housing 42 (from the light exit surface side) to cover the lighting device main body 24 and the lower housing 42 holding the main body therein, including the four lateral sections.

The bent members 46 have a concave (U-shaped) sectional profile that is always identical throughout their length. That is, each bent member 46 is a bar-shaped member having a U-shaped profile in cross section perpendicular to the direction in which they extends.

As shown in FIG. 2, the bent members 46 are fitted between the lateral faces of the lower housing 42 and the lateral faces of the upper housing 44 such that the outer face of one of the parallel sections of the U-shaped member is connected with the lateral section of the lower housing 42 whereas the outer face of the other parallel section is connected with the lateral section of the upper housing 44.

Various known methods including a method using bolts and nuts and a method using an adhesive may be used to connect the lower housing 42 with the bent members 46 and the bent members 46 with the upper housing 44.

By thus providing the bent members 46 between the lower housing 42 and the upper housing 44, the rigidity of the housing 26 can be increased to prevent the light guide plate 30 from warping. As a result, for example, light having no or reduced luminance unevenness and illuminance unevenness can be efficiently emitted. Further, even in cases where the light guide plate used is liable to develop a warp, the warp can be corrected more reliably or the warping of the light guide plate can be prevented more reliably, thereby allowing light having no or reduced luminance unevenness and illuminance unevenness to be emitted through the light exit surface.

Various materials such as metals and resins may be used to form the upper housing, the lower housing and the bent members of the housing. The material used is preferably light in weight and very strong.

While the bent members are provided as separate members in the embodiment under discussion, they may be integrated with the upper housing or the lower housing. Alternatively, the housing may not have the bent members.

The support members 48 are rod members each having an identical shape in cross section perpendicular to the direction in which they extend.

As shown in FIG. 2, the support members 48 are provided between the reflector 34 and the lower housing 42, more specifically, between the reflector 34 and the lower housing 42 at positions corresponding to the ends of the rear surface 30b of the light guide plate 30 on the side close to the first light incidence surface 30c and the second light incidence surface 30d, respectively. The support members 48 thus secure the light guide plate 30 and the reflector 34 to the lower housing 42 and support them.

The light guide plate 30 can be brought into close contact with the reflector 34 by supporting the reflector 34 with the support members 48. Furthermore, the light guide plate 30 and the reflector 34 can be secured to the lower housing 42 at predetermined positions.

While the support members are provided as separate members in the embodiment under discussion, the invention is not limited thereto and they may be integrated with the lower housing 42 or the reflector 34. To be more specific, projections may be formed in part of the lower housing 42 to serve as support members or projections may be formed in part of the reflector 34 to serve as support members.

The location of the support members is also not particularly limited and they may be provided at any positions between the reflector and the lower housing. To stably hold the light guide plate, the support members are preferably provided on the end sides of the light guide plate, that is, near the first light incidence surface 30c and the second light incidence surface 30d in the embodiment under discussion.

The shape of the support members 48 is not particularly limited and the support members 48 may have any of various shapes. The support members 48 may also be formed of various materials. For example, two or more support members may be provided at predetermined intervals.

Further, the support members may have such a shape as to fill the whole space formed by the reflector and the lower housing. More specifically, the support members may have a shape such that the side thereof facing the reflector has a contour following the surface of the reflector and the side thereof facing the lower housing has a contour following the surface of the lower housing. In cases where the whole surface of the reflector is supported by the support members, the reflector can be reliably prevented from being separated from the light guide plate, and light reflected by the reflector can be prevented from causing luminance unevenness and illuminance unevenness.

The backlight unit 20 is basically configured as described above.

In the backlight unit 20, light emitted from the light sources 28 provided on both sides of the light guide plate 30 enters through the light incidence surfaces (the first light incidence surface 30c and the second light incidence surface 30d) of the light guide plate 30. The incident light through the respective surfaces is scattered by scatterers contained inside the light guide plate 30 as the light travels inside the light guide plate 30 and is emitted through the light exit surface 30a directly or after being reflected by the rear surface 30b. Then, part of the light leaking through the rear surface is reflected by the reflector 34 to enter the light guide plate 30 again.

Thus, light emitted through the light exit surface 30a of the light guide plate 30 is transmitted through the optical member 32 and emitted through the light exit surface 24a of the lighting device main body 24 to illuminate the liquid crystal display panel 12.

The liquid crystal display panel 12 uses the drive unit 14 to control the light transmittance according to the position so as to display characters, figures, images, etc. on the surface of the liquid crystal display panel 12.

Next, the planar lighting device 20 will be described in greater detail by referring to specific examples.

Figure 31:
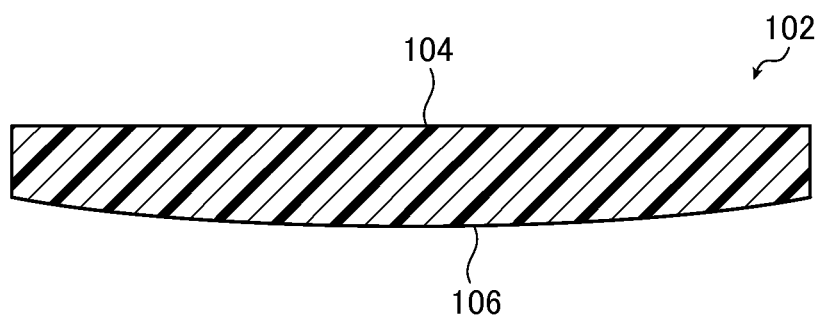
FIG. 31 is a schematic cross-sectional view showing a conventional light guide plate.

In Examples, the normalized illuminance distribution of outgoing light was determined by computer simulation for a single-layer light guide plate (the light exit surface has a flat shape and the rear surface has a convex shape toward the rear surface direction; see FIG. 31), a two-layer light guide plate, and a three-layer light guide plate.

In the simulation, the material of the transparent resin of the light guide plate and the material of the scattering particles were modeled as PMMA and silicone. In the simulation, the scattering particles were calculated as polydisperse particles except Example 7 in which monodisperse particles were compared with polydisperse particles.

Example 1

In Example 1, a light guide plate 30 corresponding to a 42-inch screen size was used. More specifically, the following light guide plate was used: the length from the first light incidence surface 30c to the second light incidence surface 30d was 545 mm; the length from the light exit surface 30a at the bisector α to the rear surface 30b, that is, the thickness D of the thinnest portion was 2.56 mm; the thickness at the first light incidence surface 30c and the second light incidence surface 30d, that is, the thickness of the thickest portion was 3.0 mm; the length of the first layer 60 from the light exit surface 30a at the bisector α to the interface z, that is, the thickness D1 of the thinnest portion of the first layer 60 was 2.12 mm; the length of the second layer 62 from the interface z at the bisector α to the rear surface 30b, that is, the thickness D2 of the thickest portion of the second layer 62 was 0.44 mm; the radius of curvature R of the light exit surface 30a was 75,000 mm; and the recess height d was 0.44 mm. The scattering particles to be kneaded and dispersed in the light guide plate had a particle size of 4.5 μm.

The light guide plate having the shape described above was used to measure the illuminance distribution in Example 11 in which the first layer 60 had a particle concentration Npo of 0.02 wt % and the second layer 62 had a particle concentration Npr of 0.10 wt %, and Example 12 in which the first layer 60 had a particle concentration Npo of 0.02 wt % and the second layer 62 had a particle concentration Npr of 0.15 wt %. In Comparative Example 11, measurement was made for a single-layer light guide plate 102 having the shape shown in FIG. 31 in which both of the first layer 60 and the second layer 62 had a particle concentration of 0.05 wt %, that is, the light guide plate was uniform in particle concentration. The light guide plate 102 in Comparative Example 11 had a flat light exit surface 104 and a rear surface 106 which was convex toward the rear surface direction.

An area where luminance measured near the light incidence portion increased sharply was covered with a reflection member in actual use and hence light was not emitted through the light exit surface of the planar lighting device and light striking this area was not recognized as light that might cause uneven brightness. The light was not recognized as light emitted through the light exit surface. Accordingly, light in this area was disregarded. This will also apply to the examples given below.

Figure 9:
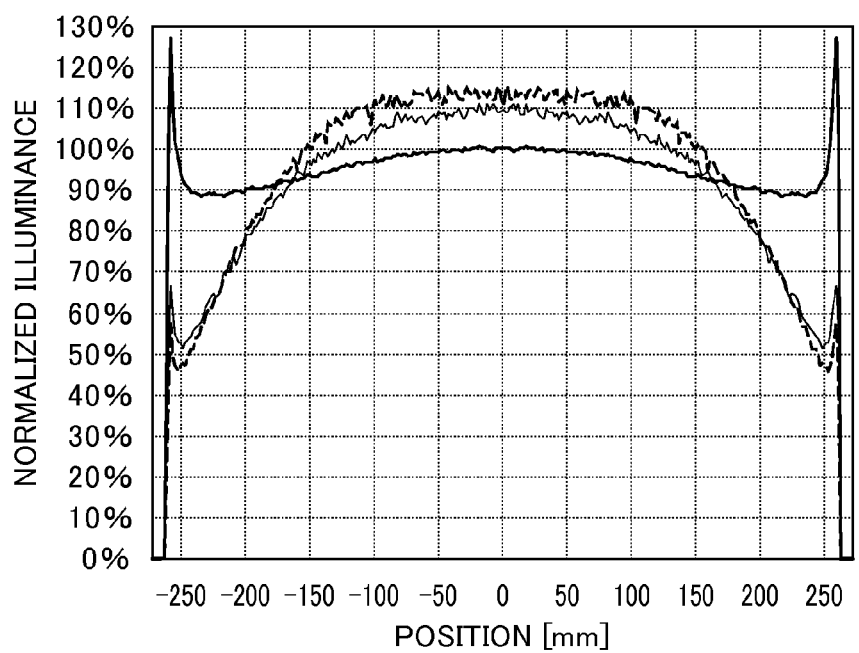
FIG. 9 is a graph showing the measurement results of the illuminance distribution of light emitted through the light exit surface of the light guide plate.

Table 2 shows the illuminance measurement results and FIG. 9 shows the normalized illuminance distributions. In FIG. 9, the vertical axis indicates the normalized illuminance, and the horizontal axis indicates the distance [mm] from the center of the light guide plate, and Example 11 is indicated by a thin solid line, Example 12 by a broken line, and Comparative Example 11 by a thick solid line.

TABLE 2

| 42-inch | | Example 11 | Example 12 | Comparative Example 11 |
|---|---|---|---|---|
| Thickness of light incidence surface (mm) | | 3.00 | 3.00 | 1.60 |
| Central portion thickness (mm) | | 2.56 | 2.56 | 3.43 |
| Particle concentration (wt %) | First layer | 0.02 | 0.02 | 0.05 |
| | Second layer | 0.10 | 0.15 | |
| Normalized illuminance (%) | | 110 | 113 | 100 |

As shown in FIG. 9 and Table 2, the illuminance in the central portion of the light guide plates in Examples 11 and 12 is improved by 10% or more as compared to the single-layer light guide plate 102 which has the shape shown in FIG. 31 and is uniform in particle concentration. As shown in FIG. 9, the light guide plates in Examples 11 and 12 each have an illuminance distribution which is higher in the middle than in Comparative Example 11.

The relationship between the thickness of the light incidence surfaces and the light incidence efficiency will now be described.

Figure 11:
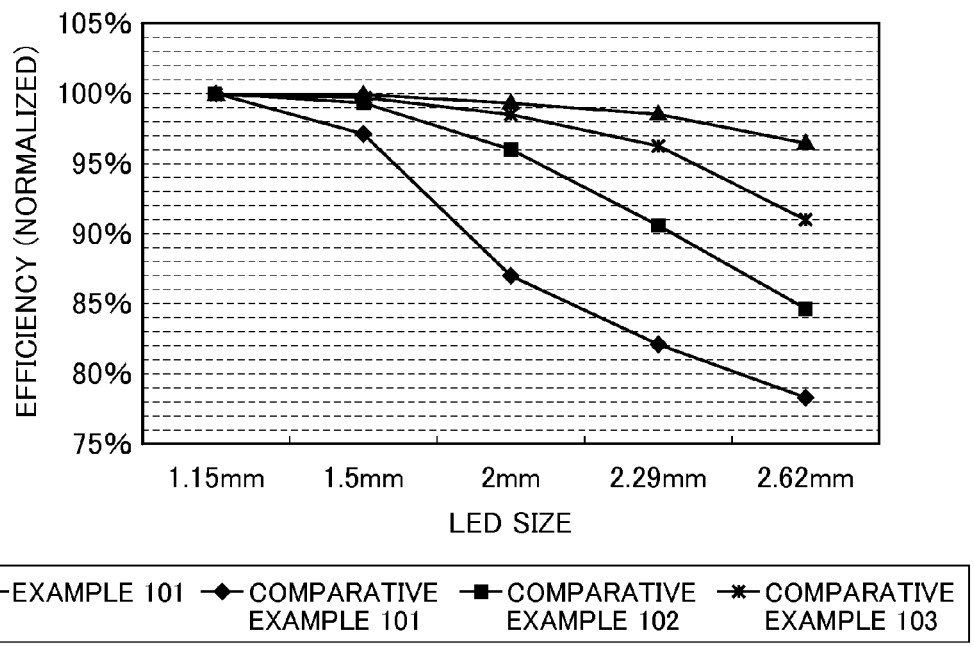
FIG. 11 is a graph showing the relationship between the size of the LEDs on the light incidence surface of the light guide plate and the efficiency.

FIG. 11 shows changes in light incidence efficiency of the light guide plates in various shapes corresponding to the 40-inch screen size depending on the size of LEDs serving as light sources.

The light incidence efficiency was measured in the two-layer light guide plate in Example 101 of which the shape was the same as that of the light guide plate 30 shown in FIG. 2 and in which the screen size was only changed to 40 inches and the thickness of the light incidence surfaces, that is, the thickness of the light incidence surfaces in a direction substantially perpendicular to the light exit surface was 2.62 mm. The light incidence efficiency was measured in Comparative Example 101 for the single-layer light guide plate with the shape shown in FIG. 31 which had a light incidence surface thickness of 1.50 mm and was uniform in particle concentration, Comparative Example 102 for the two-layer light guide plate with the shape shown in FIG. 32 which had a light incidence surface thickness of 1.96 mm and was different in particle concentration, and Comparative Example 103 for the two-layer light guide plate which had a light incidence surface thickness of 2.29 mm and a flat shape and was different in particle concentration. The distance between the light-emitting face of each LED and the light incidence surface was 0.2 mm.

In FIG. 11, the vertical axis indicates the normalized efficiency and the horizontal axis indicates the size of the light-emitting face of each LED, and Example 101, Comparative Example 101, Comparative Example 102, and Comparative Example 103 are indicated by a black triangle, a black rhombus, a black square and an asterisk, respectively.

FIG. 11 shows that, in cases where an LED in which the height of the light-emitting face is smaller than the thickness of the light incidence surfaces of each light guide plate is used, the light incidence efficiency is 95% or more, but the use of a large-sized LED, that is, an LED in which the dimension in the height direction of the light-emitting face is larger than the thickness of the light incidence surface of the light guide plate in order to increase the amount of light in the light sources sharply decreases the light incidence efficiency. This shows that it is important to increase the thickness of the light incidence surface of the light guide plate in order to use a large-sized LED with a large amount of light.

Figure 10:
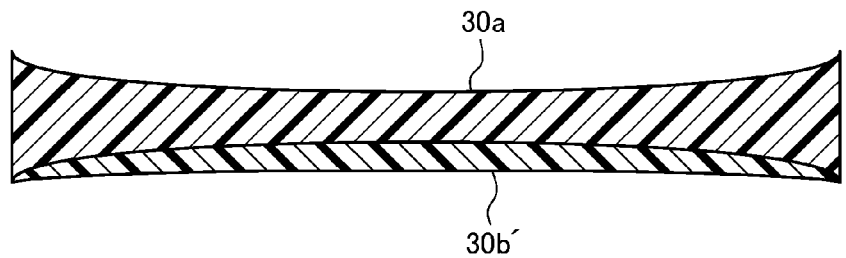
FIG. 10 is a schematic cross-sectional view showing another example of the light guide plate of the invention.

As a modification of Example 1, the rear surface of the light guide plate may be replaced by a rear surface 30b' convex toward the light exit surface side (i.e., concave toward the rear surface side) as shown in FIG. 10. In this case, the radius of curvature R of the concave rear surface 30b' is preferably in a range of 150,000 mm to 1,850,000 mm in terms of the balance between the optical properties and the mechanical properties (strength). The concave shape may be a circular or elliptical arc shape or an arc shape formed by combining a circle and an ellipse. An alternative shape is also possible in which an arc is used in the central portion of the light exit surface 30a and the light exit surface 30a is tapered toward the first and second light incidence surfaces 30c and 30d and connected thereto.

Table 3 shows examples of the radius of an arc forming the concave shape of the light exit surface and the concave shape of the rear surface in each screen size.

TABLE 3

| Screen size (inch) | 37 | 46 | 100 |
|---|---|---|---|
| Light exit surface side radius R1 (mm) | 60000 | 75000 | 175000 |
| Rear surface side radius R2 (mm) | 250000 | 350000 | 750000 |

Figure 32:
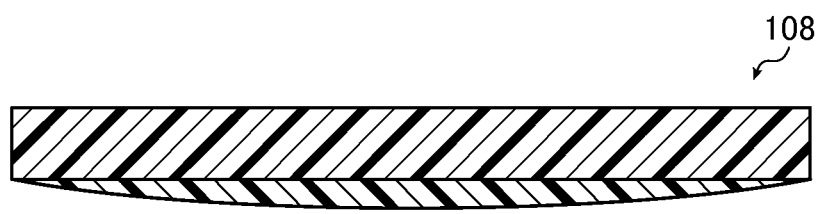
FIG. 32 is a schematic cross-sectional view showing another conventional light guide plate.

The use of the two-layer light guide plates (in Examples 11, 12 and 101) which have a concave light exit surface and are different in particle concentration enables the light incidence surface to be increased in size as compared to the light guide plates of the shapes shown in FIGS. 31 and 32. Accordingly, the light incidence efficiency can be increased while obtaining an illuminance distribution which is high in the middle.

Since the light incidence surface may have a large size as compared to the flat light guide plate having the same average thickness, the light guide plates may have a higher light incidence efficiency and a lower weight. In addition, the illuminance distribution which is high in the middle can be obtained.

Example 2

Figure 12:
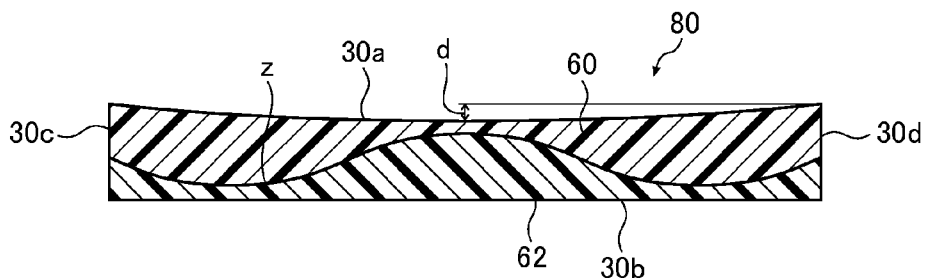
FIG. 12 is a schematic cross-sectional view showing still another example of the light guide plate of the invention.

Example 2 used a light guide plate 80 for a 46-inch screen size which had the same outer shape as that in Example 1 and in which, as shown in FIG. 12, the interface z between the first layer 60 and the second layer 62 was continuously changed so that the second layer 62 decreased in thickness from the bisector α (i.e., the central portion of the light exit surface) toward the first light incidence surface 30c and the second light incidence surface 30d, and then continuously changed so that the second layer 62 increased in thickness again toward the light exit surface 30a side near the first light incidence surface 30c and the second light incidence surface 30d. Then, the reverse-biased concentration was used to determine the combined particle concentration and the thickness of the first layer 60 and the second layer 62 (profile of the interface z) was determined based on the determined combined particle concentration.

More specifically, the combined particle concentration curve has a profile with a local maximum value at the center of the light guide plate 30 and changes on both sides so as to have local minimum values at positions away by about two-thirds of the distance from the center to the light incidence surfaces (30d and 30e) in the illustrated example.

The reverse-biased concentration as used herein is a process particularly applied to an arched light guide plate which decreases in thickness toward the central portion, and the particle concentration (distribution) is obtained by determining the illuminance distribution (luminance distribution) when there is no particle and multiplying the combined density by a constant to make the determined distribution flat.

The illuminance distribution (luminance distribution) of light emitted from the light guide plate in a state in which there is no particle is first determined to obtain the reverse-biased concentration. In this process, the illuminance distribution (luminance distribution) which is concave in the central portion is determined particularly in cases where the thickness decreases toward the central portion. Next, the difference of the illuminance distribution from the flat distribution is determined and is multiplied by a constant for each unit volume of the light guide plate in its depth direction to determine the particle concentration per unit volume, which is used as the reverse-biased concentration. The cross-sectional shape of the two-layer light guide plate is determined from the reverse-biased concentration. In addition, the particle concentration distribution which is high in the middle as desired is determined from a flat two-layer light guide plate and is converted to the cross-sectional shape of the two-layer light guide plate. Finally, the two-layer cross-sectional shape determined from the reverse-biased concentration distribution and the two-layer cross-sectional shape determined from the flat plate are added to determine a desired two-layer cross-sectional shape.

The light guide plate 80 had the following dimensions: the length of the first layer 60 from the light exit surface 30a at the bisector α to the interface z, that is, the thickness D1 of the first layer 60 was 0.25 mm; the length of the second layer 62 from the interface z at the bisector α to the rear surface 30b, that is, the thickness D2 of the second layer 62 was 0.75 mm; the thickness of the light incidence surfaces (30c, 30d) was 1.5 mm; the thickness D2' of the second layer 62 at the first light incidence surface 30c and the second light incidence surface 30d was 0.2 mm; the radius of curvature R of the light exit surface 30a was 75,000 mm; and the recess height d was 0.5 mm. The scattering particles to be kneaded and dispersed in the light guide plate had a particle size of 7 μm.

The light guide plate having the shape as described above was used to measure the illuminance distribution in Example 21 in which the first layer 60 had a particle concentration Npo of 0.02 wt % and the second layer 62 had a particle concentration Npr of 0.10 wt %. Measurement was made for a single-layer light guide plate in Comparative Example 21 having the shape shown in FIG. 31 in which both of the first layer 60 and the second layer 62 had a particle concentration of 0.05 wt %, that is, the light guide plate was uniform in particle concentration, and a two-layer flat light guide plate in Comparative Example 22 in which the second layer on the rear surface side was convex toward the light exit surface side, the first layer had a particle concentration Npo of 0 wt % and the second layer had a particle concentration Npr of 0.07 wt %. The light guide plate 102 in Comparative Example 21 had a flat light exit surface 104 and a rear surface 106 which was convex toward the rear surface direction.

Figure 13:
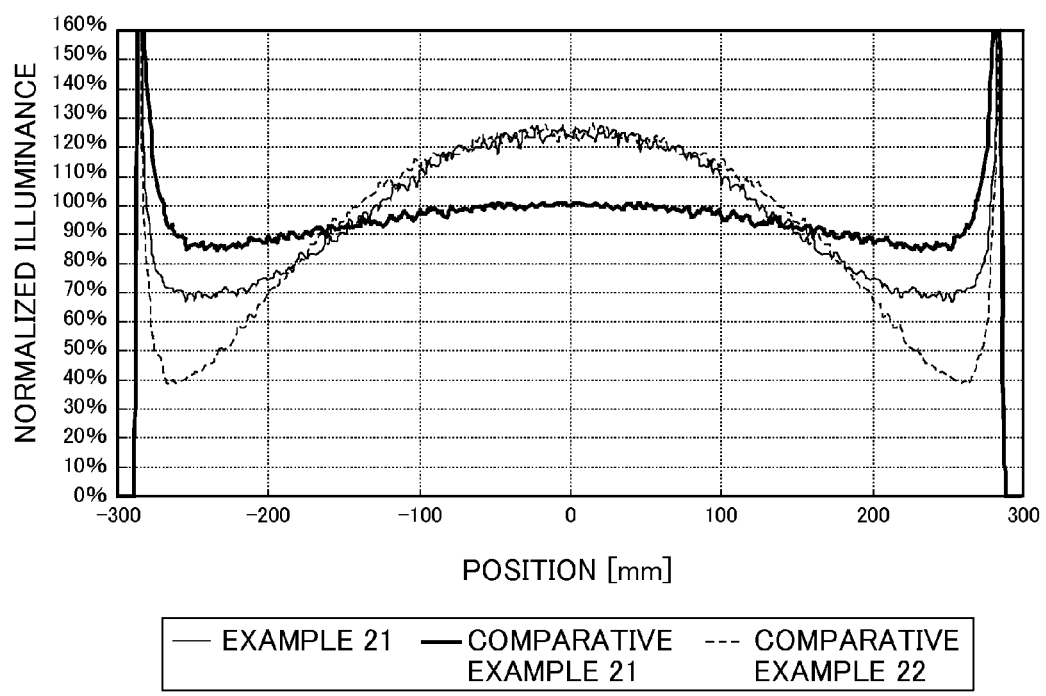
FIG. 13 is a graph showing the measurement results of the illuminance distribution of light emitted through the light exit surface of the light guide plate.

FIG. 13 shows the normalized illuminance distribution which includes the illuminance measurement results. In FIG. 13, the vertical axis indicates the normalized illuminance, and the horizontal axis indicates the distance [mm] from the center of the light guide plate, and Example 21 is indicated by a thin solid line, Comparative Example 21 by a thick solid line, and Comparative Example 22 by a broken line.

As shown in FIG. 13, the central luminance of the light guide plate in Example 21 is improved by 20% or more as compared to the light guide plate 102 in Comparative Example 21. The illuminance in the vicinities of the light incidence surfaces is also improved as compared to Comparative Example 22. The film is constituted by a diffusion film, a prism sheet and a diffusion film and the luminance is also proportional to the illuminance and hence it can be said that the luminance is improved.

By thus using the light guide plate (in Example 21) which had a concave light exit surface and in which, of the two layers different in particle concentration, the second layer was optimized by the reverse-biased concentration, the illuminance in the vicinities of the light incidence surfaces is more improved than that in the light guide plates in Examples 11 and 12 and a more favorable illuminance distribution which is high in the middle may be obtained.

In the light guide plate 80 shown in FIG. 12, when seen from the cross section perpendicular to the longitudinal direction of the light incidence surface, the interface z between the first layer 60 and the second layer 62 is a curved surface which is concave toward the light exit surface 30a in the regions near the first light incidence surface 30c and the second light incidence surface 30d, and is a curved surface which is convex toward the light exit surface 30a in the central region of the light guide plate 80.

In a cross section perpendicular to the longitudinal direction of the light incidence surface, the concave curved surface and the convex curved surface which form the interface z may be curves expressed by part of a circle or an ellipse, quadratic curves, curves expressed by polynomials, or curves obtained by combination thereof.

In cases where the concave and convex curved surfaces forming the interface z are expressed by part of a circle, the 32 inch-sized light guide plate preferably has the concave curved surface with a radius of curvature $R_{y1}$ satisfying 2,500 mm≤$R_{y1}$≤110,000 and the convex curved surface with a radius of curvature $R_{y2}$ satisfying 2,500 mm≤$R_{y2}$≤120,000 mm, and the 46 inch-sized light guide plate preferably has the concave curved surface with a radius of curvature $R_{y1}$ satisfying 2,500 mm≤$R_{y1}$≤230,000 mm and the convex curved surface with a radius of curvature $R_{y2}$ satisfying 2,500 mm≤$R_{y2}$≤250,000 mm, and the 65 inch-sized light guide plate preferably has the concave curved surface with a radius of curvature $R_{y1}$ satisfying 5,000 mm≤$R_{y1}$≤450,000 mm and the convex curved surface with a radius of curvature $R_{y2}$ satisfying 5,000 mm≤$R_{y2}$≤490,000 mm.

Example 3

In Example 3, measurement was made by changing the radii of curvature $R_{y1}$ and $R_{y2}$ of the concave curved surface and the convex curved surface of the interface z and the particle concentrations of the first layer 60 and the second layer 62 in the light guide plate 80 shown in FIG. 12 for a 32-inch screen size.

More specifically, the light guide plate used in Example 3 had the following dimensions: the length from the first light incidence surface 30c to the second light incidence surface was 413 mm; the thickness of the first light incidence surface 30c and the second light incidence surface 30d, that is, the thickness D2 of the thickest portion was 3 mm; the recess height d was 0.5 mm; the radius of curvature of the light exit surface 30a was 42,500 mm; the thickness D3 of the second layer 62 at the first light incidence surface was 0.5 mm; the thickness D4 of the thinnest portion of the second layer 62 was 0.48 mm; and the thickness D5 of the thickest portion of the second layer 62 was 1.0 mm. The scattering particles to be kneaded and dispersed in the light guide plate had a particle size of 4.5 μm.

The above-described light guide plate was used to measure the illuminance distribution in Example 31 in which the radius of curvature $R_{y1}$ of the concave curved surface of the interface z was 2,500 mm, the radius of curvature $R_{y2}$ of the convex curved surface was 35,000 mm, the first layer 60 had a particle concentration Npo of 0.003 wt %, and the second layer 62 had a particle concentration Npr of 0.125 wt %; Example 32 in which the radius of curvature $R_{y1}$ of the concave curved surface of the interface z was 2,500 mm, the radius of curvature $R_{y2}$ of the convex curved surface was 35,000 mm, the first layer 60 had a particle concentration Npo of 0.003 wt %, and the second layer 62 had a particle concentration Npr of 0.15 wt %; Example 33 in which the radius of curvature $R_{y1}$ of the concave curved surface of the interface z was 30,000 mm, the radius of curvature $R_{y2}$ of the convex curved surface was 2,500 mm, the first layer 60 had a particle concentration Npo of 0.003 wt %, and the second layer 62 had a particle concentration Npr of 0.125 wt %; Example 34 in which the radius of curvature $R_{y1}$ of the concave curved surface of the interface z was 30,000 mm, the radius of curvature $R_{y2}$ of the convex curved surface was 2,500 mm, the first layer 60 had a particle concentration Npo of 0.003 wt %, and the second layer 62 had a particle concentration Npr of 0.15 wt %; and Example 35 in which the radius of curvature $R_{y1}$ of the concave curved surface of the interface z was 30,000 mm, the radius of curvature $R_{y2}$ of the convex curved surface was 2,500 mm, the first layer 60 had a particle concentration Npo of 0.003 wt %, and the second layer 62 had a particle concentration Npr of 0.175 wt %.

Figure 14A:
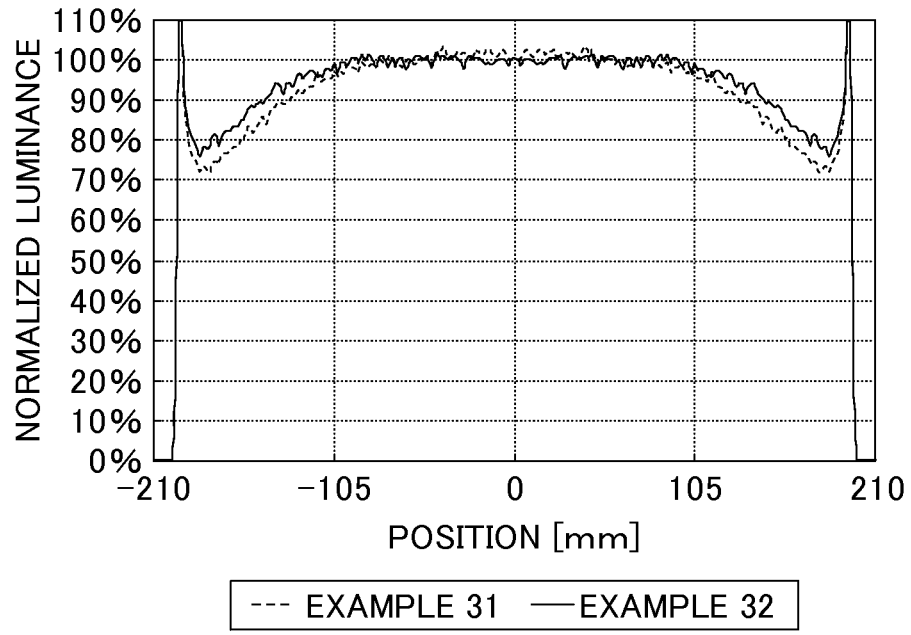
FIG. 14A and FIG. 14B are graphs showing the measurement results of the luminance distribution of light emitted through the light exit surface of the light guide plate.
Figure 14B:
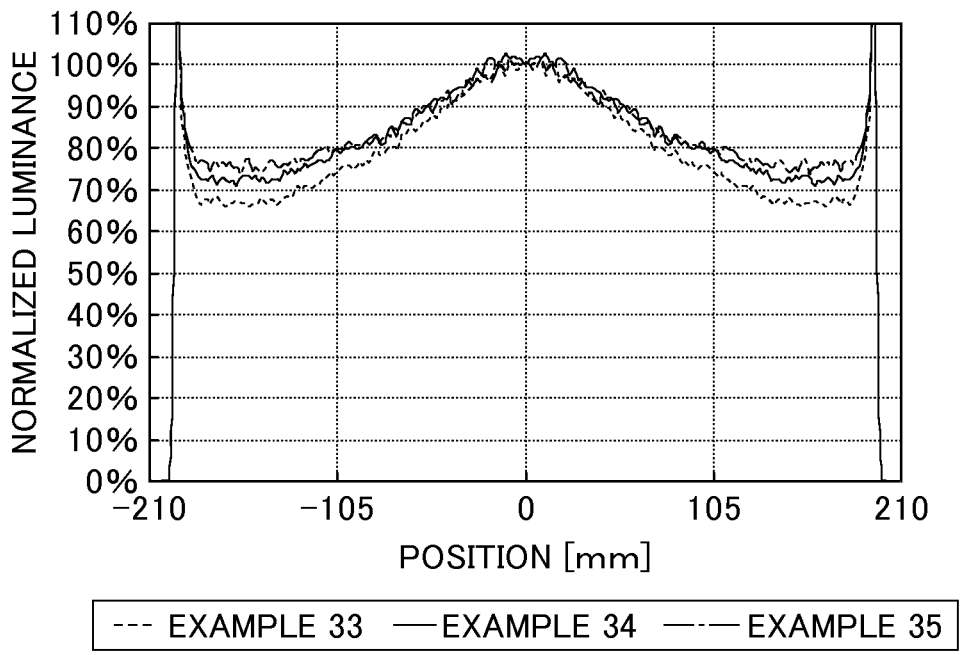

FIG. 14A and FIG. 14B show the normalized illuminance distribution which includes the illuminance measurement results. In FIG. 14A, the vertical axis indicates the normalized illuminance and the horizontal axis indicates the distance [mm] from the center of the light guide plate, and Example 31 is indicated by a broken line and Example 32 by a solid line. Likewise, in FIG. 14B, Example 33 is indicated by a broken line, Example 34 by a solid line and Example 35 by a chain line.

In a 32-inch sized light guide plate, the illuminance distribution can be made high in the middle as shown in FIGS. 14A and 14B by adjusting the radius of curvature $R_{y1}$ of the concave curved surface of the interface z in a range expressed by 2,500 mm≤$R_{y1}$≤110,000 mm and the radius of curvature $R_{y2}$ of the convex curved surface in a range expressed by 2,500 mm≤$R_{y2}$≤120,000 mm.

Example 4

In Example 4, measurement was made by changing the radii of curvature $R_{y1}$ and $R_{y2}$ of the concave curved surface and the convex curved surface of the interface z and the particle concentrations of the first layer 60 and the second layer 62 in the light guide plate 80 shown in FIG. 12 for a 65-inch screen size.

More specifically, the light guide plate used in Example 4 had the following dimensions: the length from the first light incidence surface 30c to the second light incidence surface was 830 mm; the thickness of the first light incidence surface 30c and the second light incidence surface 30d, that is, the thickness D2 of the thickest portion was 1 mm; the recess height d was 0.2 mm; the radius of curvature of the light exit surface 30a was 165,000 mm; the thickness D3 of the second layer 62 at the first light incidence surface was 0.18 mm; the thickness D4 of the thinnest portion of the second layer 62 was 0.16 mm; and the thickness D5 of the thickest portion of the second layer 62 was 0.35 mm. The scattering particles to be kneaded and dispersed in the light guide plate had a particle size of 4.5 μm.

The above-described light guide plate was used to measure the illuminance distribution in Example 41 in which the radius of curvature $R_{y1}$ of the concave curved surface of the interface z was 5,000 mm, the radius of curvature $R_{y2}$ of the convex curved surface was 490,000 mm, the first layer 60 had a particle concentration Npo of 0.003 wt %, and the second layer 62 had a particle concentration Npr of 0.02 wt %; Example 42 in which $R_{y1}$ was 5,000 mm, $R_{y2}$ was 490,000 mm, Npo was 0.003 wt %, and Npr was 0.03 wt %; Example 43 in which $R_{y1}$ was 5,000 mm, $R_{y2}$ was 490,000 mm, Npo was 0.003 wt %, and Npr was 0.04 wt %; Example 44 in which $R_{y1}$ was 450,000 mm, $R_{y2}$ was 5,000 mm, Npo was 0.003 wt %, and Npr was 0.02 wt %; Example 45 in which $R_{y1}$ was 450,000 mm, $R_{y2}$ was 5,000 mm, Npo was 0.003 wt %, and Npr was 0.04 wt %; and Example 46 in which $R_{y1}$ was 450,000 mm, $R_{y2}$ was 5,000 mm, Npo was 0.003 wt %, and Npr was 0.09 wt %.

Figure 15A:
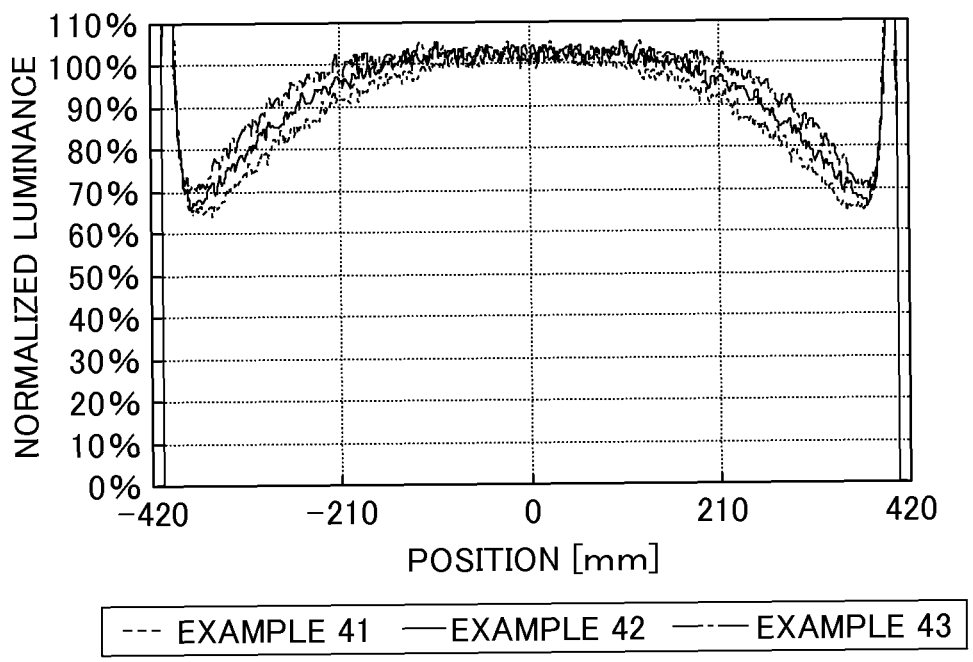
FIG. 15A and FIG. 15B are graphs showing the measurement results of the luminance distribution of light emitted through the light exit surface of the light guide plate.
Figure 15B:
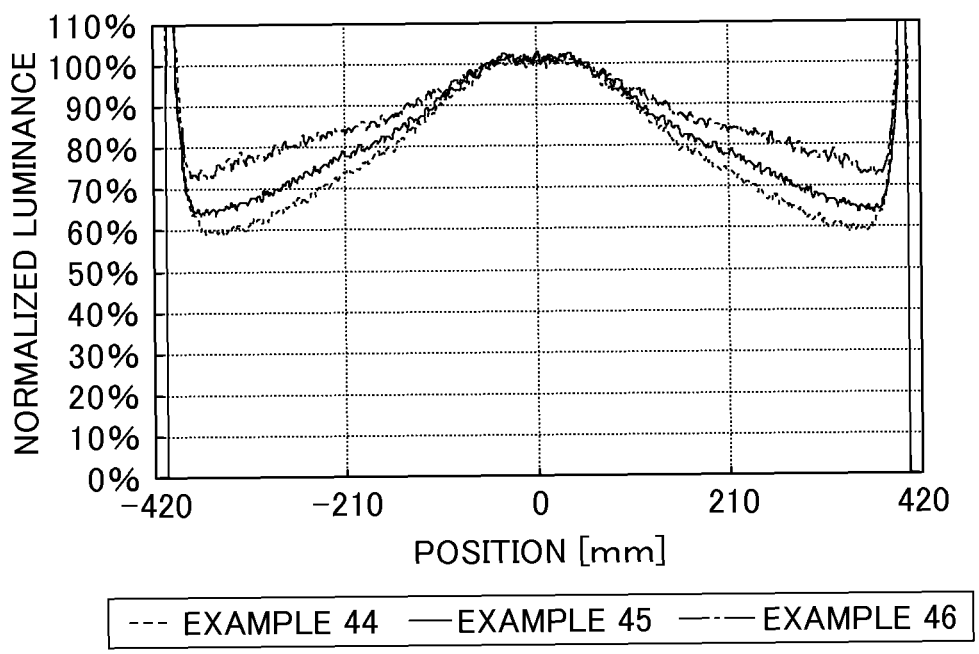

FIG. 15A and FIG. 15B show the normalized illuminance distribution which includes the illuminance measurement results. In FIG. 15A, the vertical axis indicates the normalized luminance, and the horizontal axis indicates the distance [mm] from the center of the light guide plate, and Example 41 is indicated by a broken line, Example 42 by a solid line, and Example 43 by a chain line. Likewise, in FIG. 15B, Example 44 is indicated by a broken line, Example 45 by a solid line and Example 46 by a chain line.

In a 65-inch sized light guide plate, the illuminance distribution can be made high in the middle as shown in FIGS. 15A and 15B by adjusting the radius of curvature $R_{y1}$ of the concave curved surface of the interface z in a range expressed by 5,000 mm≤$R_{y1}$≤450,000 mm and the radius of curvature $R_{y2}$ of the convex curved surface in a range expressed by 5,000 mm≤$R_{y2}$≤490,000 mm.

Example 5

Figure 16:
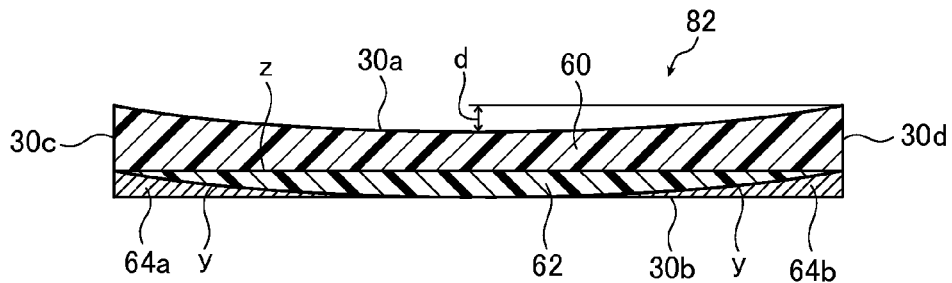
FIG. 16 is a schematic cross-sectional view showing yet another example of the light guide plate of the invention.

In Example 5, a three-layer light guide plate 82 which had the same outer shape as that used in Example 1 and was different in particle concentration was used. As shown in FIG. 16, the light guide plate 82 comprises a first layer 60, a second layer 62 and third layers 64a and 64b.

In the light guide plate 82, an interface z between the first layer 60 and the second layer 62 is flat and an interface y between the second layer 62 and the third layers 64a and 64b has the same concave shape as the light exit surface 30a. More specifically, the thickness of the third layers 64a and 64b decreases with increasing distance from the first light incidence surface 30c and the second light incidence surface 30d toward the center such that the third layers 64a and 64b are the thinnest at portions corresponding to the bisector α in the central portion and thickest at the two light incidence surfaces (the first light incidence surface 30c and the second light incidence surface 30d) on both ends.

The light guide plate 82 had the following dimensions: the thickness at the bisector α was 2.56 mm; the length of the first layer 60 from the light exit surface 30a at the bisector α to the interface z, that is, the thickness D1 of the first layer 60 was 2.12 mm; the length of the second layer 62 from the interface z at the bisector α to the rear surface 30b, that is, the thickness D2 of the second layer 62 was 0.44 mm; the thickness D2' of the second layer 62 at the first light incidence surface 30c and the second light incidence surface 30d was 0 mm; the thickness D3 of the third layers 64a and 64b at the first light incidence surface 30c and the second light incidence surface 30d was 0.44 mm; the radius of curvature R of the light exit surface 30a and the interface y was 75,000 mm; and the recess height d was 0.44 mm. The scattering particles to be kneaded and dispersed in the light guide plate had a particle size of 7 μm.

The light guide plate having the shape as described above was used to measure the illuminance distribution in Example 51 using the three-layer light guide plate in which the first layer 60 had a particle concentration Npo of 0 wt %, the second layer 62 had a particle concentration Npr of 0.10 wt %, and each of the third layers 64a and 64b had a particle concentration of 0 wt %; and Example 52 using the two-layer light guide plate in Example 1 in which the first layer 60 had a particle concentration Npo of 0 wt % and the second layer 62 had a particle concentration Npr of 0.10 wt %. The third layers 64a and 64b may have any particle concentrations. In Comparative Example 51, measurement was made for a single-layer light guide plate having the shape shown in FIG. 31 in which all the layers had a particle concentration of 0.05 wt %, that is, the light guide plate was uniform in particle concentration.

Figure 17:
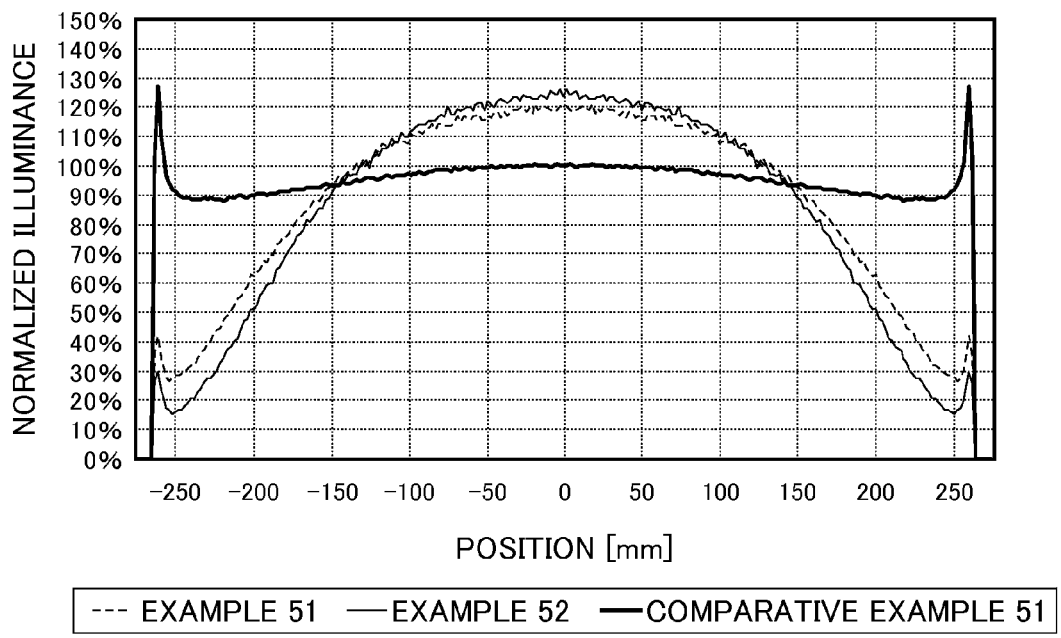
FIG. 17 is a graph showing the measurement results of the illuminance distribution of light emitted through the light exit surface of the light guide plate.

FIG. 17 shows the normalized illuminance distribution which includes the illuminance measurement results. In FIG. 17, the vertical axis indicates the normalized illuminance and the horizontal axis indicates the distance [mm] from the center of the light guide plate, and Example 51 is indicated by a broken line, Example 52 by a solid line, and Comparative Example 51 by a thick solid line.

As shown in FIG. 17, the light guide plate in Example 51 having the third layer can improve the illuminance in the vicinities of the light incidence surfaces (30c, 30d (light incidence portions)) as compared to the light guide plate in Example 52, that is, suppress the reduction in illuminance and further reduce the unevenness at the light incidence portions.

Example 6

Figure 18:
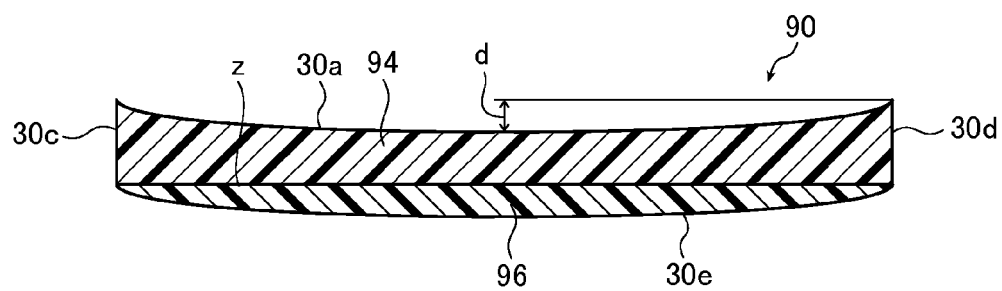
FIG. 18 is a schematic cross-sectional view showing still yet another example of the light guide plate of the invention.

In Example 6, a light guide plate 90 as shown in FIG. 18 corresponding to a 42-inch screen size in which the rear surface side had the same shape as the light exit surface side was used. The light exit surface side and the rear surface side of the light guide plate have the same shape (are concave toward the light exit surface side), which enables light guide plates to be superposed on each other and subjected to machining. The interface z between the first layer 94 and the second layer 96 of the light guide plate 90 is flat.

Use was made of the light guide plate 90 as shown in FIG. 18 having the following dimensions: the length from the first light incidence surface 30c to the second light incidence surface 30d was 545 mm; the length from the light exit surface 30a at the bisector α to the rear surface 30b, (the thickness at the central portion) was 2.5 mm; the thickness of the first light incidence surface 30c and the second light incidence surface 30d was 2 mm; the length of the first layer 94 from the light exit surface 30a at the bisector α to the interface z, that is, the thickness D1 of the thinnest portion of the first layer 94 was 1.56 mm; the length of the second layer 96 from the interface z at the bisector α to the rear surface 30e, that is, the thickness D2 of the thickest portion of the second layer 96 was 0.5 mm; the radius of curvature R of the light exit surface 30a and the rear surface 30e was 75,000 mm; and the recess height d was 0.44 mm. The scattering particles to be kneaded and dispersed in the light guide plate had a particle size of 4.5 μm.

The light guide plate having the shape as described above was used to measure the illuminance distribution in Example 61 in which the first layer 94 had a particle concentration Npo of 0.02 wt % and the second layer 96 had a particle concentration Npr of 0.10 wt %; and Example 62 in which the first layer 94 had a particle concentration Npo of 0 wt % and the second layer 96 had a particle concentration Npr of 0.10 wt %. In Comparative Example 61, measurement was made for the single-layer light guide plate having the shape shown in FIG. 31 in which the particle concentration of both the first and second layers was adjusted to 0.05 wt %, that is, for the light guide plate which was uniform in particle concentration. In the light guide plate 102 in Comparative Example 61, the length from the light exit surface 104 at the bisector α to the rear surface 106 (thickness at the central portion) was 3.5 mm and the thickness of the light incidence surfaces at both the ends was 2 mm.

FIG. 19 shows the normalized illuminance distribution which includes the illuminance measurement results. In FIG. 19, the vertical axis indicates the normalized illuminance and the horizontal axis indicates the distance [mm] from the center of the light guide plate, and Example 61 is indicated by a broken line, Example 62 by a thin solid line, and Comparative Example 61 by a thick solid line.

The light guide plate 90 in which the length from the light exit surface 30a at the bisector α to the rear surface 30b (thickness at the central portion) was 3.5 mm and the thickness of the light incidence surfaces 30c and 30d was 3 mm was used to measure the illuminance distribution in Example 63 in which the first layer 94 had a particle concentration Npo of 0.02 wt % and the second layer 96 had a particle concentration Npr of 0.15 wt %; and Example 64 in which the first layer 94 had a particle concentration Npo of 0 wt % and the second layer 96 had a particle concentration Npr of 0.15 wt %. In Comparative Example 61, measurement was made in the same manner as above for the single-layer light guide plate having the shape shown in FIG. 31.

FIG. 20 shows the normalized illuminance distribution which includes the illuminance measurement results. In FIG. 20, the vertical axis indicates the normalized illuminance and the horizontal axis indicates the distance [mm] from the center of the light guide plate, and Example 63 is indicated by a broken line, Example 64 by a thin solid line, and Comparative Example 61 by a thick solid line.

As shown in FIGS. 19 and 20, each of the light guide plates in Examples 61 to 64 has an illuminance distribution which is high in the middle as in the light guide plates in Examples 1 to 3 and their illuminance at the central portion is improved by 10 to 20% or more compared to Comparative Example 61.

Figure 21:
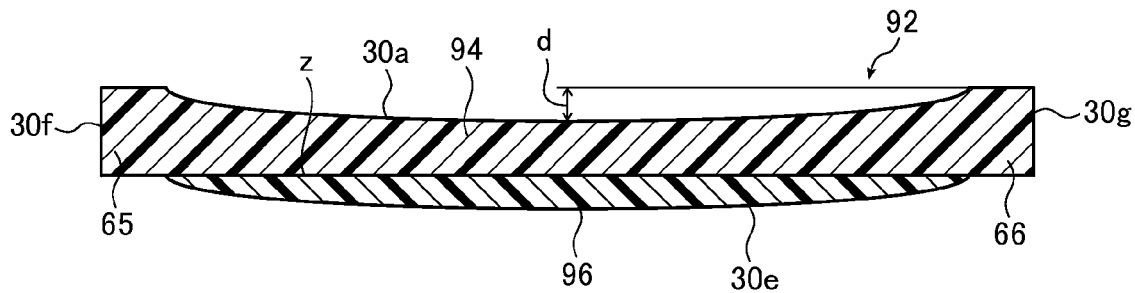
FIG. 21 is a schematic cross-sectional view showing another example of the light guide plate of the invention.

In addition, a light guide plate 92 may be used which has, as shown in FIG. 21, flanges 65 and 66 at the first light incidence surface 30c and the second light incidence surface 30d of the light guide plate 90, respectively, in order to enable light guide plates to be easily superposed on each other upon machining. In this case, the light incidence surfaces are a first light incidence surface 30f and a second light incidence surface 30g. In addition, the particle concentration may be changed in the flanged portions which serve as mixing zones. The particle concentration is preferably equal to or higher than the maximum density in the other portions.

The radius of curvature R on the light exit surface side may be different from that on the rear surface side if light guide plates can be superposed on each other and machined. Even if the radius of curvature R on the light exit surface side is different from that on the rear surface side, by extending the rear surfaces of the flanges 65, 66 beyond the portion of the rear surface 30e intersecting with the bisector α, that is, the portion most projected on the rear surface side or by inserting a spacer, the flanges are brought into contact directly or via the spacer when light guide plates are superposed on each other, thus enabling the light guide plates to be stably superposed on each other and machined. The same effects as those of the inverted wedge-shaped light guide plate can also be obtained by reducing the radius of curvature on the rear surface side below the radius of curvature on the light exit surface side, in other words, by further projecting the rear surface on the rear surface side.

As a modification of Example 6, a multi-layer planar light guide plate may be deformed instead of the light guide plate as shown in FIG. 18 in which the light exit surface side is concave and the rear surface side has the same shape as the light exit surface side. The same effects as the light guide plate shown in FIG. 18 can be obtained by warping the thin light guide plate toward the side opposite from the liquid crystal panel with a mechanical deformation means such as pressing the light guide plate with a resin projection, that is, by deforming the light guide plate so as to be concave toward the light exit surface side.

Light guide plates of two layers with different particle concentrations, each having a concave light exit surface and a convex rear surface (Examples 61 to 64) can be superposed on each other upon machining to cut and polish the end faces of the light guide plates at a time. Therefore, the costs involved in machining the end faces can be considerably reduced. Since the light exit surface side is concave, the light guide plate may not readily warp toward the liquid crystal panel side. In addition, in cases where the flat multi-layer light guide plate is deformed into a concave shape, the productivity is more favorable, thus enabling further cost reduction.

As a result, the thus obtained light guide plate having the concave light exit surface may not readily warp toward the liquid crystal panel side. The use of the two-layer light guide plate which has the concave light exit surface and the two layers different in particle concentration enables the light incidence surfaces to be increased in size as compared to the light guide plates having the shapes (inverted wedge shape) shown in FIGS. 31 and 32. Accordingly, the light incidence efficiency can be increased while obtaining an illuminance distribution which is high in the middle.

Since the light incidence surfaces may have a large size as compared to the flat light guide plate having the same average thickness, the light guide plates may have a higher light incidence efficiency and a lower weight. In addition, the illuminance distribution which is high in the middle can be obtained.

It is seen that optimizing the second layer of the two layers different in particle concentration by the reverse-biased concentration enables the illuminance to be improved in the vicinities of the light incidence surfaces to obtain a more desirable illuminance distribution which is high in the middle.

It is also seen that providing the third layer improves the illuminance in the vicinities of the light incidence surfaces, suppresses the reduction of the illuminance and reduces the unevenness in the light entrance portion.

Light guide plates having the same shape on the light exit surface side and the rear surface side (in which the light exit surface side (light exit surface) has a concave shape and the rear surface has a convex shape) can be superposed on each other upon machining to cut and polish the end faces of the light guide plates at a time, thus leading to considerable cost reduction upon end face machining.

Figure 22:
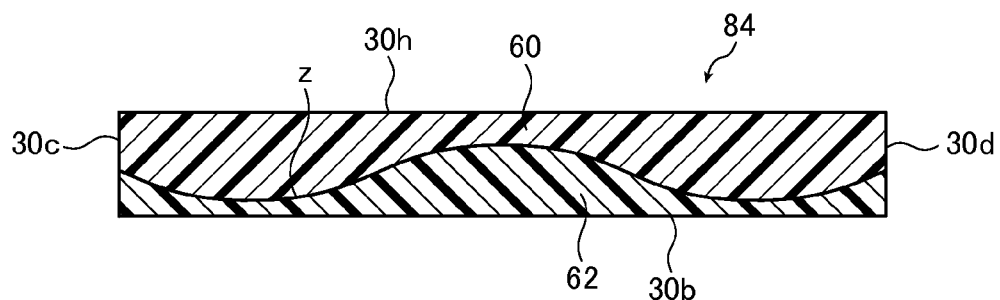
FIG. 22 is a schematic cross-sectional view showing a further example of the light guide plate of the invention.

As a modification of Example 2, a light guide plate 84 which is the same as the light guide plate 80 in Example 2 except that the recess height d is 0 as shown in FIG. 22, that is, the light guide plate having a flat light exit surface 30h may be used.

Figure 23:
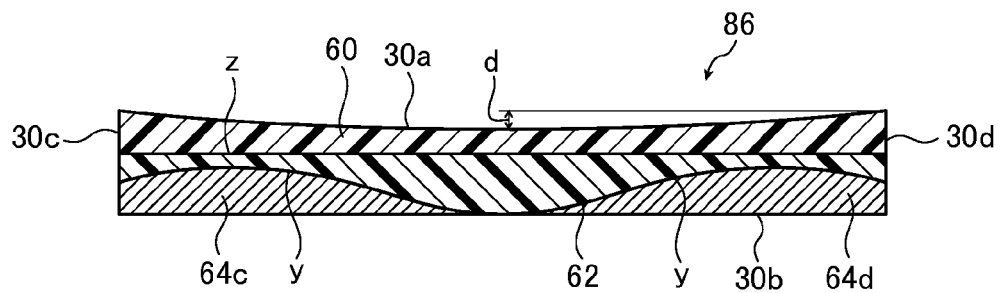
FIG. 23 is a schematic cross-sectional view showing still another example of the light guide plate of the invention.

As a modification of Example 5, Example 2 may be combined with Example 5 to provide a three-layer light guide plate 86 as shown in FIG. 23 in which the combined particle concentration is a concentration optimized using the reverse-biased concentration and the interface y of the light guide plate 82 in Example 5 continuously changes so that the second layer 62 decreases in thickness from the light exit surface 30a at the bisector α (i.e., central portion of the light exit surface) toward the first light incidence surface 30c and the second light incidence surface 30d, and further continuously changes so that the second layer 62 increases in thickness again toward the rear surface 30b in the vicinities of the first light incidence surface 30c and the second light incidence surface 30d (i.e., the second layer 62 (intermediate layer) is undulating with respect to the rear surface 30b side).

The three layers desirably have particle concentrations satisfying the following relationship: first layer 60≤third layers 64a and 64b<second layer 62. The first layer 60 desirably has a particle concentration of 0 wt %. The interface z between the first layer 60 and the second layer 62 desirably has a flat shape or a shape concave in the same direction as the light exit surface.

The light guide plate thus having the three layers may facilitate the fine adjustment of the luminance distribution (illuminance distribution).

Next, the illuminance distribution of light emitted from the light guide plate was determined in cases where polydisperse particles were used as scattering particles to be kneaded and dispersed in the light guide plate and in cases where monodisperse particles were used as scattering particles.

Example 7

In Example 7, the light guide plate 84 as shown in FIG. 22 corresponding to a 40-inch screen size was used. More specifically, the following light guide plate was used: the length from the first light incidence surface 30c to the second light incidence surface 30d was 545 mm; the thickness of the light guide plate was 1.5 mm; the thickness of the first layer 60 at the bisector α, that is, the thickness of the thinnest portion of the first layer 60 was 0.15 mm; the thickness of the thickest portion of the first layer 60 was 0.5 mm; the thickness of the first layer 60 at the light incidence surfaces was 0.2 mm; the radius of curvature $R_{y1}$ of the concave curved surface of the interface z was 25,000 mm; the radius of curvature $R_{y2}$ of the convex curved surface of the interface z was 150,000 mm; the first layer 60 had a particle concentration Npo of 0.02 wt %; and the second layer 62 had a particle concentration Npr of 0.16 wt %.

The above-described light guide plate was used to measure the illuminance distribution in Example 71 in which the polydisperse particles having the scattering particle size distribution as shown in FIG. 7A were kneaded and dispersed and Example 72 in which the polydisperse particles having the scattering particle size distribution as shown in FIG. 7B were kneaded and dispersed.

As Comparative Examples, the illuminance distribution was measured in Comparative Example 71 in which the monodisperse particles with an average particle size of 4.5 μm were kneaded and dispersed as the scattering particles in the above-described light guide plate and Comparative Example 72 in which the monodisperse particles with an average particle size of 3.0 μm were kneaded and dispersed as the scattering particles in the light guide plate.

In Examples, the incident light used was light at a single wavelength. Light at a wavelength of 555 nm was used in Example 71 and Comparative Example 71 and light at a wavelength of 450 nm in Example 72 and Comparative Example 72.

Figure 24A:
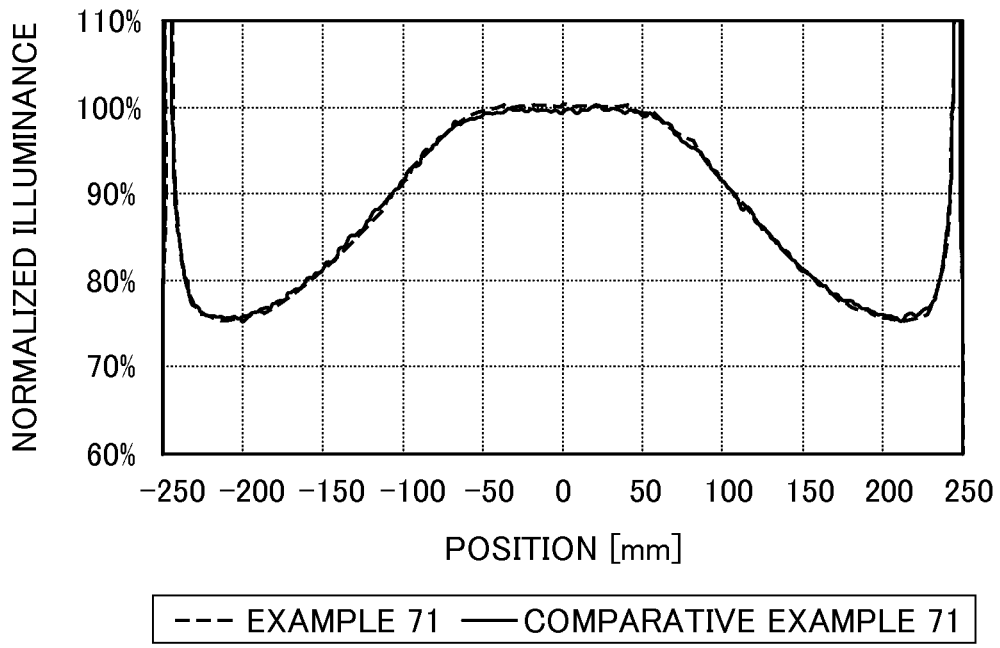
FIG. 24A and FIG. 24B are graphs showing the measurement results of the illuminance distribution of light emitted through the light exit surface of the light guide plate.
Figure 24B:
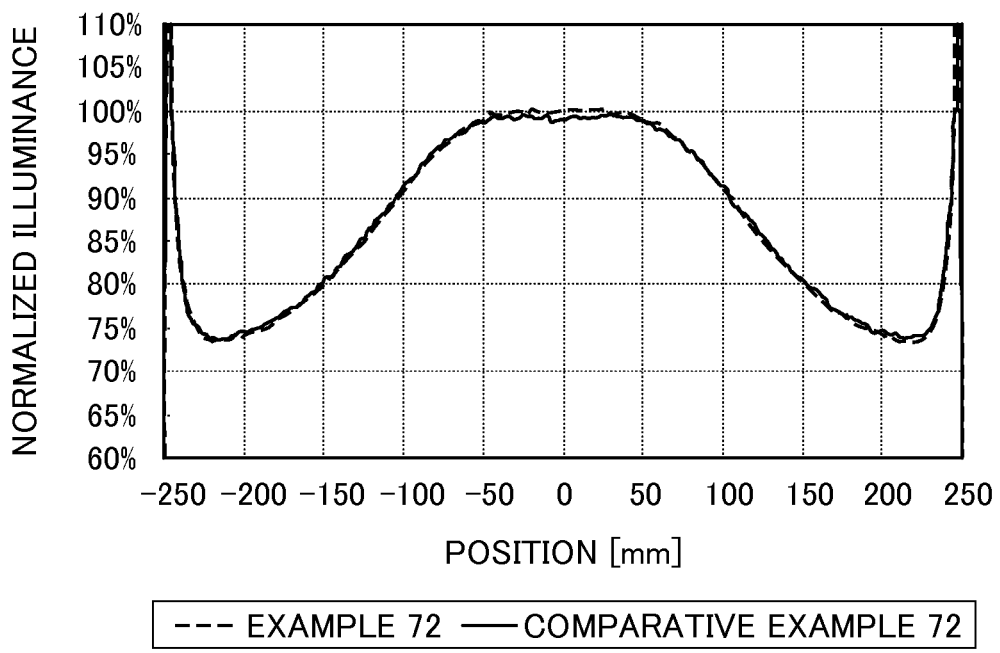

FIGS. 24A and 24B show the normalized illuminance distributions which include the illuminance measurement results. In FIG. 24A, the vertical axis indicates the normalized illuminance and the horizontal axis indicates the distance [mm] from the center of the light guide plate, and Example 71 is indicated by a broken line and Comparative Example 71 by a thin solid line. In FIG. 24B, the vertical axis indicates the normalized illuminance and the horizontal axis indicates the distance [mm] from the center of the light guide plate, and Example 71 is indicated by a broken line and Comparative Example 71 by a thin solid line.

As shown in FIGS. 24A and 24B, the light guide plate in Example 71 and the light guide plate in Comparative Example 71 have similar illuminance distributions. The light guide plate in Example 72 and the light guide plate in Comparative Example 72 have also similar illuminance distributions.

As described above, even in cases where polydisperse particles including a mixture of particles with different particle sizes are used, the invention can prevent the light use efficiency from being reduced by incorporating the scattering particles at particle concentrations which are different from region to region inside the light guide plate.

Although each of the light guide plates according to the above embodiments is of a type comprising two light sources disposed on two light incidence surfaces so that light enters from both sides of the light guide plate, the invention is not limited thereto; the light guide plate may be of a type comprising a single light source disposed on one light incidence surface so that light enters from one side of the light guide plate. Reduction in number of light sources enables the number of parts and hence the costs to be reduced.

In cases where light is allowed to enter from one side of the light guide plate, the interface z may have an asymmetric shape. For example, the light guide plate may have one light incidence surface and a second layer which has such an asymmetric shape that the second layer is the largest in thickness at a position away from the light incidence surface beyond the bisector of the light exit surface.

Figure 25A:
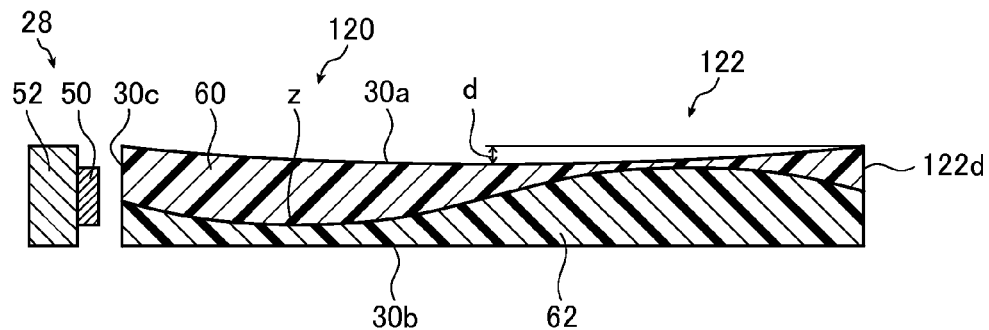
FIG. 25A to FIG. 25D are schematic cross-sectional views each showing part of the backlight unit using another example of the inventive light guide plate.
Figure 25B:
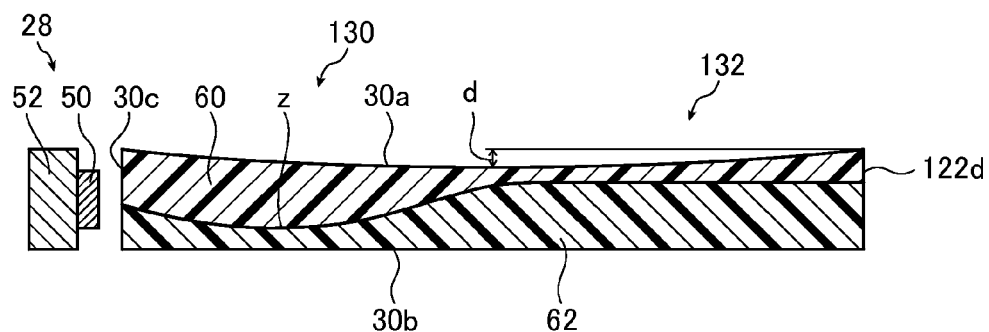

FIGS. 25A and 25B are schematic cross-sectional views each showing part of the backlight unit using another example of the light guide plate of the invention. A backlight unit 120 shown in FIG. 25A has the same configuration as the backlight unit 20 except that the light guide plate 30 is replaced by a light guide plate 122 and that only one light source 28 is used, and a backlight unit 130 shown in FIG. 25B has the same configuration as the backlight unit 20 except that the light guide plate 30 is replaced by a light guide plate 132 and only one light source 28 is used. Therefore, like elements are denoted by the same reference numerals and the following description mainly focuses on the distinctive portions.

The backlight unit 120 shown in FIG. 25A comprises the light guide plate 122 and the light source 28 disposed so as to face a first light incidence surface 30c of the light guide plate 122.

The light guide plate 122 includes the first light incidence surface 30c facing the disposed light source 28 and a lateral surface 122d opposite from the first light incidence surface 30c.

The light guide plate 122 includes a first layer 60 on the side closer to a light exit surface 30a and a second layer on the side closer to a rear surface 30b. When seen from the cross section perpendicular to the longitudinal direction of the first light incidence surface 30c, an interface z between the first layer 60 and the second layer 62 once changes so that the second layer 62 decreases in thickness from the first light incidence surface 30c toward the lateral surface 122d, and subsequently continuously changes so that the second layer 62 increases in thickness and decreases in thickness again. In other words, the interface z includes a concave curved surface toward the light exit surface 30a on the side closer to the first light incidence surface 30c and a convex curved surface toward the light exit surface 30a on the side closer to the lateral surface 122d.

In short, the concentration profile of the combined particle concentration shows a curve which changes so as to have a local minimum value on the side closer to the first light incidence surface 30c and a local maximum value on the side closer to the lateral surface 122d.

The backlight unit 130 shown in FIG. 25B comprises the light guide plate 132 and the light source 28 disposed so as to face a first light incidence surface 30c of the light guide plate 132.

The light guide plate 132 includes the first light incidence surface 30c facing the disposed light source 28 and a lateral surface 122d opposite from the first light incidence surface 30c.

The light guide plate 132 includes a first layer 60 on the side closer to a light exit surface 30a and a second layer on the side closer to a rear surface 30b. When seen from the cross section perpendicular to the longitudinal direction of the first light incidence surface 30c, an interface z between the first layer 60 and the second layer 62 once changes so that the second layer 62 decreases in thickness from the first light incidence surface 30c toward the lateral surface 122d, and subsequently changes so that the second layer 62 increases in thickness and then continuously changes so that the second layer 62 is constant in thickness. In other words, the interface z includes a concave curved surface toward the light exit surface 30a on the side closer to the first light incidence surface 30c, a convex curved surface toward the light exit surface 30a in the central portion of the light guide plate, and a flat surface parallel to the light exit surface 30a on the side closer to the lateral surface 122d from the top of the convex curved surface.

In the case of one side light incidence using only one light source as described above, the interface z is formed into an asymmetric shape so that the second layer has a minimum thickness at a position close to the light incidence surface and has a maximum thickness at a position far from the light incidence surface, whereby light emitted from the light source and allowed to enter through the light incidence surface can be guided deep into the light guide plate and the outgoing light through the light exit surface can have an illuminance distribution which is high in the middle, thus enabling the light use efficiency to be improved.

Since the light incidence surface may have a large size as compared to the flat light guide plate having the same average thickness, the light guide plates may have a higher light incidence efficiency and a lower weight.

Figure 25C:
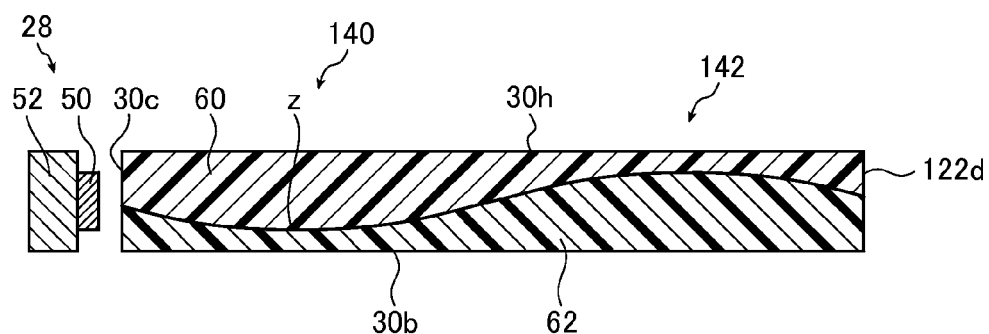

In the light guide plates 122 and 132 shown in FIGS. 25A and 25B, the light exit surface was formed into a concave shape. However, the invention is not limited thereto and the light exit surface may be flat as in light guide plates 142 and 152 shown in FIGS. 25C and 25D.

Also in the light guide plates used in the one-side light incidence backlight unit as shown in FIGS. 25A to 25D, the concentration of the first and second layers determined so that the combined particle concentration is a concentration obtained using the reverse-biased concentration and the shape of the interface z may be used. In the light guide plate used in the one-side light incidence, a light guide plate of the same shape but containing no particles may be used to determine the reverse-biased concentration from the illuminance distribution upon the one-side light incidence.

In a cross section perpendicular to the longitudinal direction of the light incidence surface, the concave curved surface and the convex curved surface which form the interface z may be curves expressed by part of a circle or an ellipse, quadratic curves, curves expressed by polynomials, or curves obtained by combination thereof.

In cases where the concave curved surface and the convex curved surface are curves expressed by part of a circle in a cross section perpendicular to the longitudinal direction of the light incidence surface, the light guide plate as shown in FIG. 25A of which the interface z has an undulating shape preferably has the concave curved surface with a radius of curvature $R_{z1}$ in a range expressed by 2,500 mm≤$R_{z1}$≤450,000 mm and the convex curved surface with a radius of curvature $R_{z2}$ in a range expressed by 2,500 mm≤$R_{z2}$≤490,000 mm.

The light illuminance distribution which is high in the middle can be more preferably obtained by adjusting $R_{z1}$ and $R_{z2}$ in the foregoing ranges.

In cases where the concave curved surface and the convex curved surface are curves expressed by part of a circle in a cross section perpendicular to the longitudinal direction of the light incidence surface, the light guide plate as shown in FIG. 25B of which the interface z has a combination shape of an undulating shape and a flat plane preferably has the concave curved surface with a radius of curvature $R_{x1}$ in a range expressed by 2,500 mm≤$R_{x1}$≤450,000 mm and the convex curved surface with a radius of curvature $R_{x2}$ in a range expressed by 2,500 mm≤$R_{x2}$≤490,000 mm.

The light illuminance distribution which is high in the middle can be more preferably obtained by adjusting $R_{x1}$ and $R_{x2}$ in the foregoing ranges.

Next, the backlight units 120 and 130 will be described in greater detail by referring to specific examples.

Example 8

In Example 81, the light guide plate 120 corresponding to a 46-inch screen size was used. More specifically, the following light guide plate was used: the length from the first light incidence surface 30c to the lateral surface 122d was 592 mm; the length from the light exit surface 30a at the bisector α to the rear surface 30b, that is, the thickness D1 of the thinnest portion was 0.8 mm; the thickness of the first light incidence surface 30c and the lateral surface 122d, that is, the thickness D2 of the thickest portion was 1.0 mm; the thickness D3 of the second layer 62 at the first light incidence surface was 0.21 mm; the thickness D4 of the thinnest portion of the second layer 62 was 0.17 mm; the thickness D5 of the thickest portion of the second layer 62 was 0.5 mm; the radius of curvature R of the light exit surface 30a was 87,500 mm; the recess height d was 0.2 mm; the radius of curvature $R_{z1}$ of the concave curved surface of the interface z was 35,000 mm; and the radius of curvature $R_{z2}$ of the convex curved surface of the interface z was 55,000 mm. The size of the scattering particles to be kneaded and dispersed in the light guide plate was adjusted to 4.5 μm, the scattering particles were not dispersed in the first layer 60 (Npo=0), and the particle concentration Npr of the second layer 62 was adjusted to 0.065 wt %.

In Comparative Example 81, light was allowed to enter the single-layer light guide plate having the shape as shown in FIG. 31 through the two sides of the light guide plate to measure the luminance distribution. Measurement was made by setting the thickness of the light guide plate at the central portion to 3.5 mm, the thickness of the light incidence surface to 2 mm and the particle concentration to 0.05 wt %.

Figure 26:
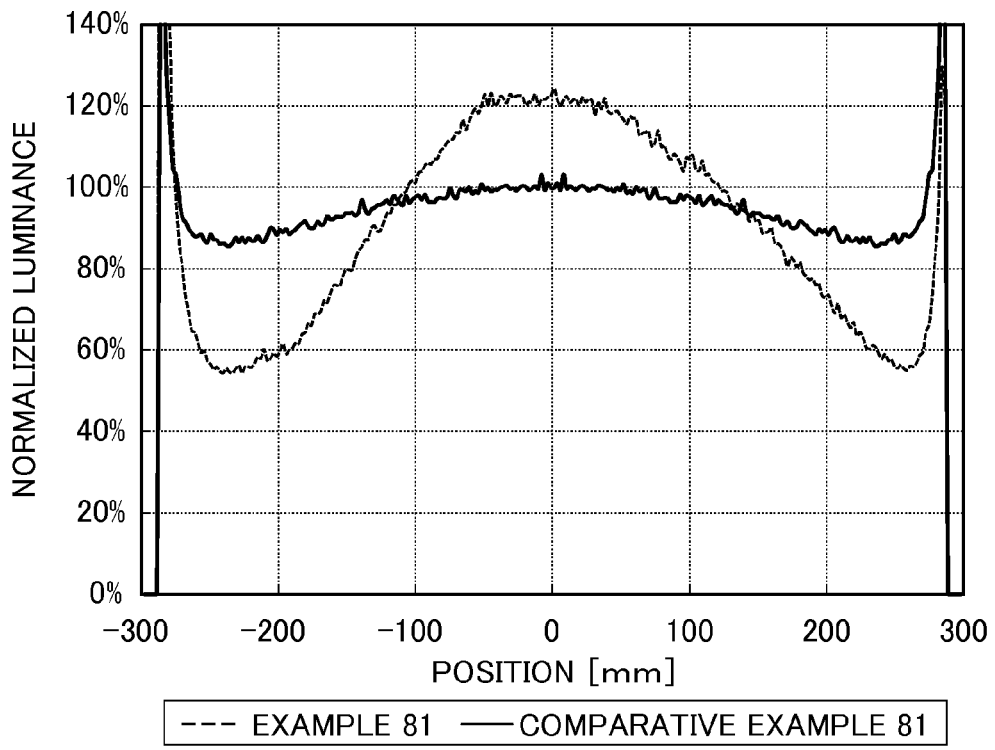
FIG. 26 is a graph showing the measurement results of the luminance distribution of light emitted through the light exit surface of the light guide plate.

FIG. 26 shows the normalized luminance distribution which includes the illuminance measurement results. In FIG. 26, the vertical axis indicates the normalized luminance and the horizontal axis indicates the distance [mm] from the center of the light guide plate, and Example 81 is indicated by a thin broken line and Comparative Example 81 by a thick solid line.

As shown in FIG. 26, also in the case of one-side light incidence, the light guide plate in Example 81 in which the interface z has an undulating shape can have improved central luminance to provide an illuminance distribution which is high in the middle as compared to the light guide plate in Comparative Example 81.

Example 9

In Example 91, the light guide plate 130 corresponding to a 57-inch screen size was used. More specifically, the following light guide plate was used: the length from the first light incidence surface 30c to the lateral surface 122d was 730 mm; the length from the light exit surface 30a at the bisector α to the rear surface 30b, that is, the thickness D1 of the thinnest portion was 0.8 mm; the thickness of the first light incidence surface 30c and the lateral surface 122d, that is, the thickness D2 of the thickest portion was 1.0 mm; the thickness D3 of the second layer 62 at the first light incidence surface was 0.19 mm; the thickness D4 of the thinnest portion of the second layer 62 was 0.15 mm; the thickness D5 of the thickest portion of the second layer 62 was 0.31 mm; the radius of curvature R of the light exit surface 30a was 135,000 mm; the recess height d was 0.2 mm; and the radius of curvature $R_{x1}$ of the concave curved surface of the interface z was 100,000 mm. The size of the scattering particles to be kneaded and dispersed in the light guide plate was adjusted to 4.5 μm, the scattering particles were not dispersed in the first layer 60 (Npo=0), and the particle concentration Npr of the second layer 62 was adjusted to 0.06 wt %.

In Comparative Example 91, light was allowed to enter the single-layer light guide plate having the shape as shown in FIG. 31 through the two sides of the light guide plate to measure the luminance distribution. Measurement was made by setting the thickness of the light guide plate at the central portion to 3.5 mm, the thickness of the light incidence surface to 2 mm and the particle concentration to 0.05 wt %.

Figure 27:
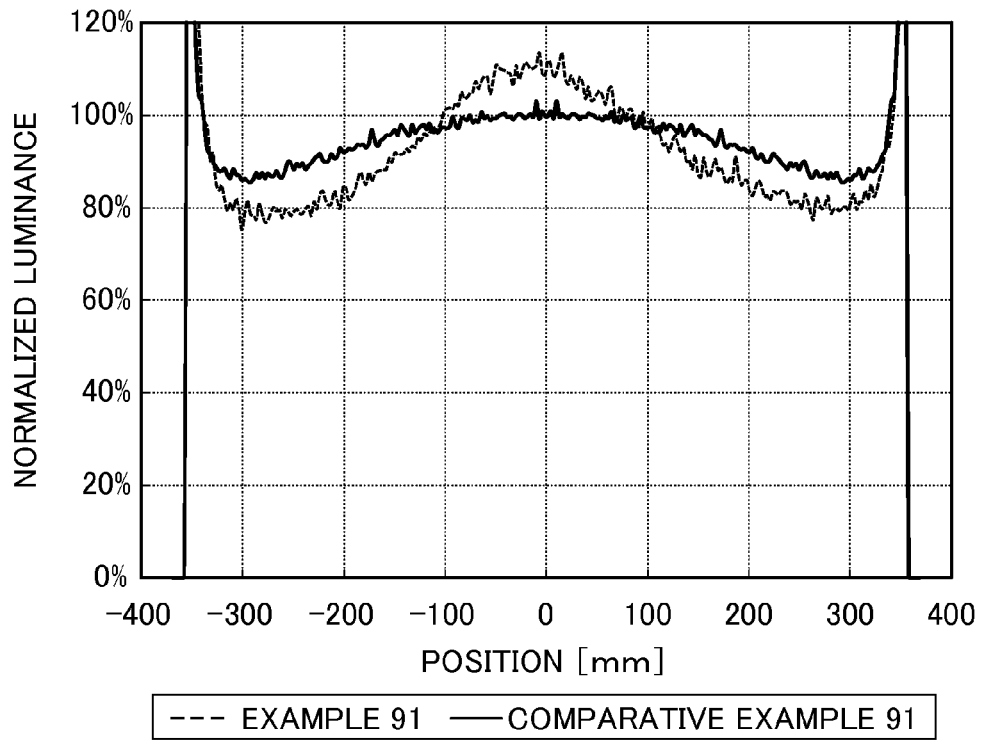
FIG. 27 is a graph showing the measurement results of the luminance distribution of light emitted through the light exit surface of the light guide plate.

FIG. 27 shows the normalized illuminance distribution which includes the illuminance measurement results. In FIG. 27, the vertical axis indicates the normalized luminance illuminance and the horizontal axis indicates the distance [mm] from the center of the light guide plate, and Example 91 is indicated by a thin broken line and Comparative Example 91 by a thick solid line.

As shown in FIG. 27, also in the case of one-side light incidence, the light guide plate in Example 91 in which the interface z has a combination shape of an undulating shape and a flat shape can have improved central luminance to provide an illuminance distribution which is high in the middle as compared to the light guide plate in Comparative Example 91.

In the light guide plates as shown in FIG. 25A to FIG. 25D where light is allowed to enter from one side, the rear surface is flat and parallel to the direction of light travel (light exit surface). However, this is not the sole case of the invention and the rear surface may be flat and inclined with respect to the direction of light travel.

Figure 25D:
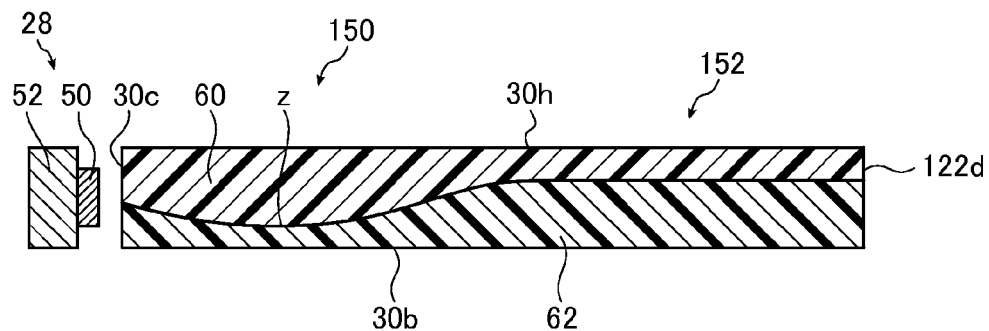

In the light guide plates as shown in FIG. 25B and FIG. 25D, the interface z between the first layer 60 and the second layer 62 includes a concave curved surface toward the light exit surface on the side closer to the first light incidence surface 30c, a convex curved surface toward the light exit surface in the central portion of the light guide plate, and a flat surface parallel to the light exit surface on the side closer to the lateral surface 122*d* from the top of the convex curved surface. However, this is not the sole case of the invention and the interface may be formed by combination of any of concave curved surfaces toward the light exit surface, convex curved surfaces toward the light exit surface, flat surfaces parallel to the light exit surface and flat surfaces inclined with respect to the light exit surface.

Figure 28:
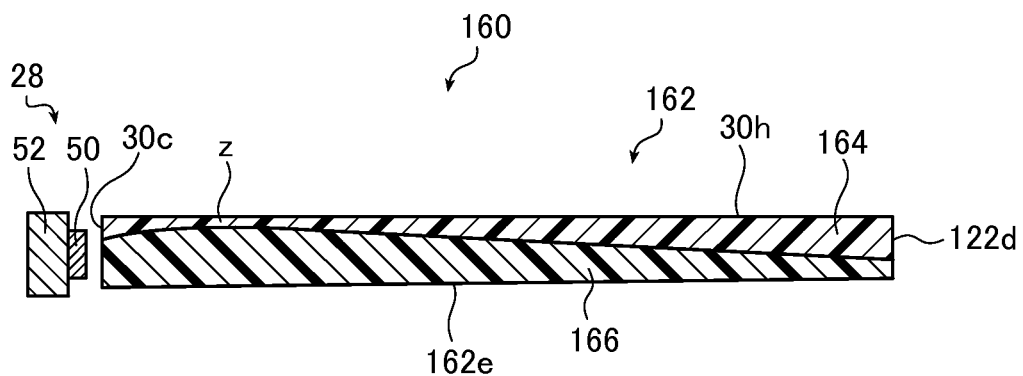
FIG. 28 is a schematic cross-sectional view showing another example of the light guide plate of the invention.

FIG. 28 is a schematic cross-sectional view showing part of a backlight unit using another example of the inventive light guide plate. Since the backlight unit shown in FIG. 28 has the same configuration as the backlight unit 150 except that the light guide plate 152 is replaced by a light guide plate 162, like elements are denoted by the same reference numerals and the following description mainly focuses on the distinctive portions.

A backlight unit 160 shown in FIG. 28 comprises the light guide plate 162 and a light source 28 disposed so as to face a first light incidence surface 30*c* of the light guide plate 162.

In the light guide plate 162, a rear surface 162*b* is inclined with respect to a light exit surface 30*h* so that the thickness in a direction perpendicular to the light exit surface 30*h* decreases with increasing distance from the light incidence surface 30*c*.

The light guide plate 162 includes a first layer 164 on the side closer to the light exit surface 30*h* and a second layer 166 on the side closer to the rear surface 162*b*. The first layer 164 contains scattering particles at a higher particle concentration than the second layer 166.

When seen from the cross section perpendicular to the longitudinal direction of the first light incidence surface 30*c*, an interface z between the first layer 164 and the second layer 166 once changes so that the first layer 164 decreases in thickness from the first light incidence surface 30*c* toward the lateral surface 122*d*, and subsequently continuously changes so that the first layer 164 increases in thickness. In other words, the interface z includes a convex curved surface toward the light exit surface 30*h* on the side closer to the first light incidence surface 30*c* and a concave curved surface toward the light exit surface 30*h* on the side closer to the lateral surface 122*d*. The convex curved surface is smoothly connected with the concave curved surface via a flat surface inclined with respect to the light exit surface 30*h* in a direction in which the thickness of the first layer 164 increases with increasing distance from the first light incidence surface 30*c*.

Curved surfaces and flat surfaces are thus combined to form the interface z into an asymmetric shape so that the layer having a higher scattering particle concentration has a minimum thickness at a position close to the light incidence surface and has a maximum thickness at a position far from the light incidence surface, whereby light emitted from the light source and allowed to enter through the light incidence surface can be guided deep into the light guide plate to improve the light use efficiency.

Next, the backlight unit 160 will be described in greater detail by referring to specific examples.

Example 10

In Example 10, the light guide plate 162 having the shape as shown in FIG. 28 corresponding to a 40-inch screen size was used. More specifically, the following light guide plate was used: the length from the first light incidence surface 30*c* to the lateral surface 122*d* was 500 mm; the interface z between the first layer 164 and the second layer 166 included a convex curved surface toward the light exit surface 30*h* on the side closer to the light incidence surface 30*c*, a concave curved surface toward the light exit surface 30*h* on the side closer to the lateral surface 122*d* and a flat surface smoothly connecting them with each other; the scattering particles to be kneaded and dispersed in the light guide plate had a particle size of 4.5 µm and the particle concentration of the scattering particles in the second layer 166 was 0 wt %. The light-emitting face of each LED chip 50 for use in the light sources 28 had the following dimensions: the length "a" in the longitudinal direction was 1.5 mm; the length "b" in the transverse direction was 2.6 mm; and the distance between the LED chip 50 and the light incidence surface 30*c* of the light guide plate 162 was 0.2 mm.

Figure 29:
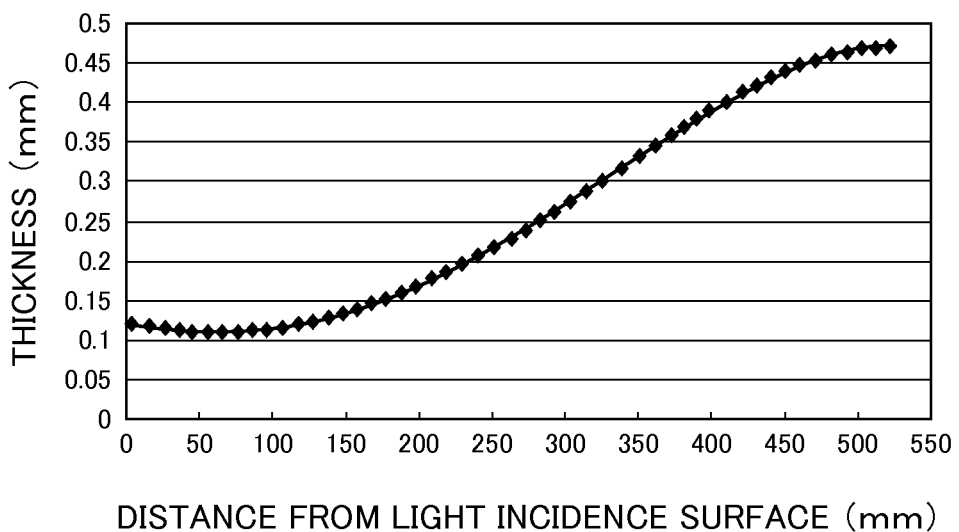
FIG. 29 is a graph showing the thickness of a first layer of the light guide plate shown in FIG. 28.

FIG. 29 is a graph showing the relationship between the distance from the light incidence surface 30*c* and the thickness of the first layer 164. More specifically, the first layer 164 had a thickness profile shown in FIG. 29.

The light guide plate having the shape as described above was used to measure the illuminance distribution in Example 101 in which the length from the light exit surface 30*h* to the rear surface 162*e* at the light incidence surface 30*c* (thickness of the light incidence surface 30*c*) was 2 mm, the length from the light exit surface 30*h* to the rear surface 162*e* at the lateral surface 122*d* (thickness of the lateral surface 122*d*) was 0.5 mm, and the first layer 164 contained scattering particles at a particle concentration of 0.12 wt %; Example 102 in which the thickness of the light incidence surface 30*c* was 2 mm, the thickness of the lateral surface 122*d* was 1.0 mm, and the first layer 164 contained scattering particles at a particle concentration of 0.163 wt %; Example 103 in which the thickness of the light incidence surface 30*c* was 2 mm, the thickness of the lateral surface 122*d* was 1.25 mm, and the first layer 164 contained scattering particles at a particle concentration of 0.188 wt %; Example 104 in which the thickness of the light incidence surface 30*c* was 2 mm, the thickness of the lateral surface 122*d* was 1.5 mm, and the first layer 164 contained scattering particles at a particle concentration of 0.203 wt %; and Example 105 in which the thickness of the light incidence surface 30*c* was 2 mm, the thickness of the lateral surface 122*d* was 1.75 mm, and the first layer 164 contained scattering particles at a particle concentration of 0.21 wt %.

The illuminance distribution was also measured in the same manner in Example 106 in which the thickness of the light incidence surface 30*c* and that of the lateral surface 122*d* were both 1.5 mm; and Example 107 in which the thickness of the light incidence surface 30*c* and that of the lateral surface 122*d* were both 2 mm.

In Comparative Example 101, a light guide plate having the shape as shown in FIG. 31 in which the thickness at the light incidence surface was 2 mm, the thickness at the central portion was 3.5 mm and the particle concentration was 0.05 wt % was used to measure the illuminance distribution in the case of light incidence from both the sides.

Figure 30A:
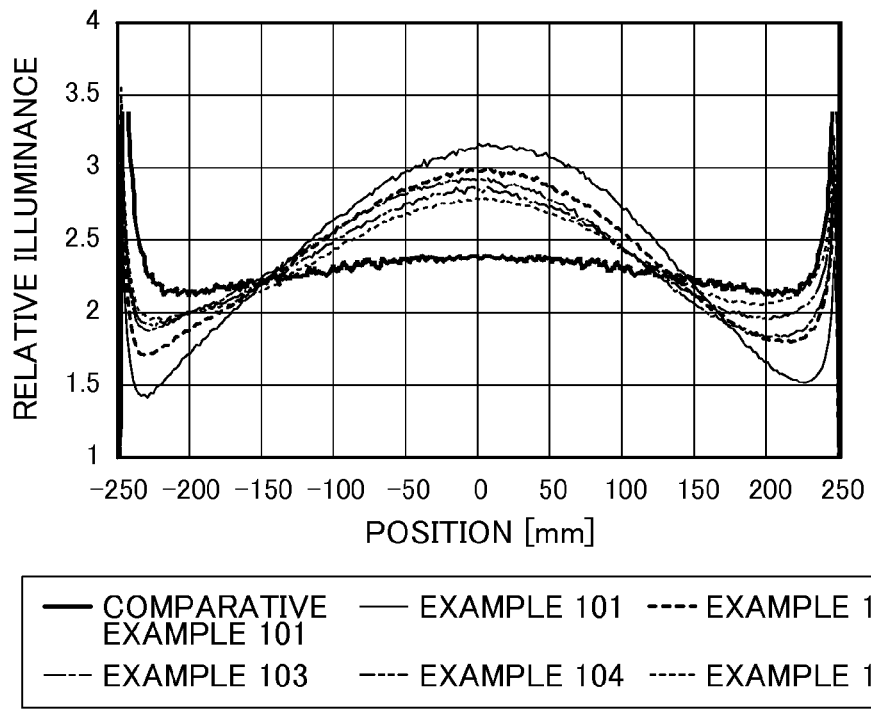
FIG. 30A and FIG. 30B are graphs showing the measurement results of the illuminance distribution of light emitted through the light exit surface of the light guide plate.
Figure 30B:
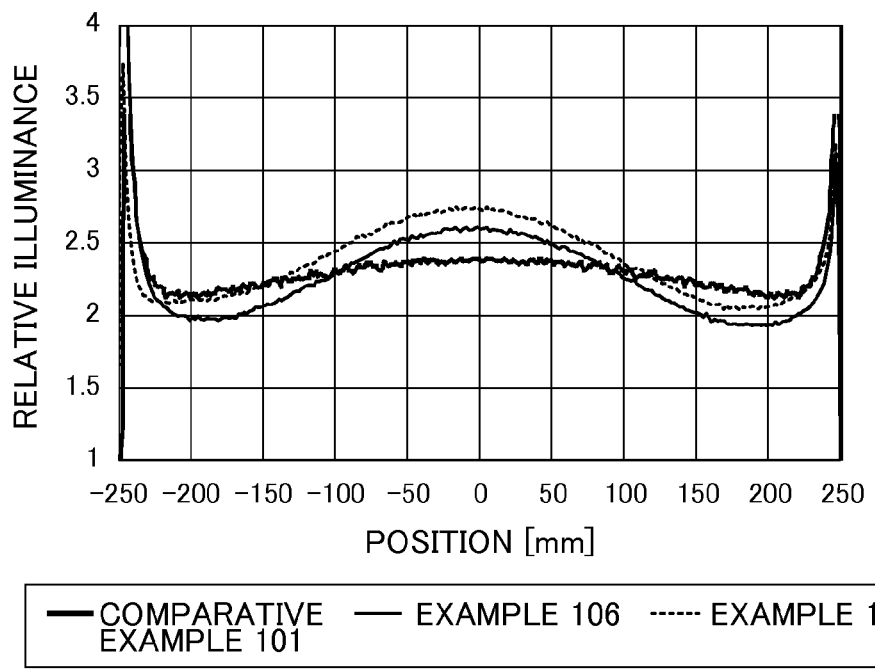

The measurement results are shown in FIG. 30A and FIG. 30B. In FIG. 30A and FIG. 30B, the vertical axis indicates the relative illuminance, and the horizontal axis indicates the distance [mm] from the center of the light guide plate. In FIG. 30A, Example 101 is indicated by a thin solid line, Example 102 by a thick broken line, Example 103 by a chain line, Example 104 by a chain double-dashed line, Example 105 by a thin broken line, and Comparative Example 101 by a thick solid line. In FIG. 30B, Example 106 is indicated by a thin solid line, Example 107 by a broken line, and Comparative Example 101 by a thick solid line.

Even in the case of one-side light incidence, by forming the interface z into a combination shape of a concave curved surface toward the light exit surface, a convex curved surface toward the light exit surface, a flat surface parallel to the light incidence surface, and a flat surface inclined with respect to the light incidence surface, and having an inclined rear surface, the distribution of the particle concentration of the scattering particles to be kneaded and dispersed in the light guide plate, and also the combined particle concentration can be made more favorable to obtain the illuminance distribution which is high in the middle, as shown in FIG. 30A and FIG. 30B. Therefore, the central luminance may be improved to obtain the illuminance distribution which is higher in the middle as compared to the light guide plate in Comparative Example 101 in which light is allowed to enter from both sides.

The backlight unit using the light guide plate of the invention is not limited to this and, in addition to the two light sources, light sources may also be provided so as to face the lateral surfaces on the short sides of the light exit surface of the light guide plate. The intensity of light emitted from the device can be enhanced by increasing the number of light sources.

Light may be emitted not only through the light exit surface but also from the rear surface side.

While the light guide plate, the planar lighting device and the liquid crystal display according to the invention have been described above in detail, the invention is not limited in any manner to the above embodiments and various improvements and modifications may be made without departing from the spirit of the invention.

DESCRIPTION OF SYMBOLS 10 liquid crystal display
12 liquid crystal display panel
14 drive unit
20, 120, 130, 140, 150, 160 backlight unit (planar lighting device)
24 lighting device main body
24a, 30a, 30h light exit surface
26 housing
28 light source
30, 80, 82, 84, 86, 90, 92, 122, 132, 142, 152, 162 light guide plate
30b, 30b', 30e, 162b rear surface
30c, 30f first light incidence surface
30d, 30g second light incidence surface
32, 170, 180 optical member unit
32a, 32c diffusion sheet
32b prism sheet
34 reflector
36 upper light guide reflector
38 lower light guide reflector
42 lower housing
44 upper housing
46 bent member
48 support member
49 power unit casing
50 LED chip
52 light source support
58 light-emitting face
60, 94, 164 first layer
62, 96, 166 second layer
64a, 64b third layer
122d lateral surface
170a, 170c microlens sheet
α bisector
y, z interface

The invention claimed is:

1. A light guide plate comprising: a rectangular light exit surface; at least one light incidence surface which is provided on at least one end side of said light exit surface and through which light traveling in a direction substantially parallel to said light exit surface enters; a rear surface on an opposite side from said light exit surface; and scattering particles dispersed in said light guide plate,
wherein said scattering particles are polydisperse particles including a mixture of particles with different particle sizes,
wherein said light guide plate includes two or more layers superposed on each other in a direction substantially perpendicular to said light exit surface and containing said scattering particles at different particle concentrations,
wherein said two or more layers include at least, a first layer disposed on a side closer to said light exit surface and having a particle concentration Npo and a second layer disposed on a side closer to said rear surface than said first layer and having a particle concentration Npr, and Npo and Npr satisfy a relationship expressed by Npo<Npr,
wherein a cross section in a direction perpendicular to said at least one light incidence surface extending from said at least one light incidence surface toward a central portion of said light exit surface has a concave shape toward a light exit surface side, and
wherein a combined particle concentration in each portion of said light guide plate is changed by changing a thickness of said first layer and a thickness of said second layer in the direction substantially perpendicular to said light exit surface.

2. The light guide plate according to claim 1, wherein in the cross section in the direction perpendicular to said at least one light incidence surface extending from said at least one light incidence surface toward the central portion of said light exit surface, an interface between said first layer and said second layer has a convex shape toward said light exit surface at the central portion of said light exit surface.

3. The light guide plate according to claim 2, wherein said combined particle concentration is determined using a reverse-biased concentration and, according to said combined particle concentration, the thickness of said second layer continuously changes so as to decrease from the central portion of said light exit surface toward said at least one light incidence surface and continuously changes so as to increase toward said at least one light incidence surface near said at least one light incidence surface.

4. The light guide plate according to claim 1, wherein said light exit surface and said rear surface have flat shapes and the concave shape on the light exit surface side is formed by warping said light guide plate on a rear surface side.

5. A light guide plate comprising: a rectangular light exit surface; at least one light incidence surface which is provided on at least one end side of said light exit surface and through which light traveling in a direction substantially parallel to said light exit surface enters; a rear surface provided on an opposite side from said light exit surface; and scattering particles dispersed in said light guide plate,
wherein said scattering particles are polydisperse particles including a mixture of particles with different particle sizes,
wherein said light guide plate includes two or more layers superposed on each other in a direction substantially perpendicular to said light exit surface and containing said scattering particles at different particle concentrations, wherein said two or more layers include at least, a first layer disposed on a side closer to said light exit surface and having a particle concentration Npo and a second layer disposed on a side closer to said rear surface than said first layer and having a particle concentration Npr, and Npo and Npr satisfy a relationship expressed by Npo<Npr, and wherein a thickness of said second layer once changes so as to decrease with increasing distance from said at least one light incidence surface and then continuously changes so as to increase.

6. The light guide plate according to claim 1, wherein said second layer has a maximum thickness at a central portion of said light exit surface.

7. The light guide plate according to claim 1, wherein an interface between said first layer and said second layer is flat and said second layer has a convex shape toward the opposite side from said light exit surface, and wherein said light guide plate further includes a third layer having a concave shape toward the light exit surface side and corresponding to the convex shape of said second layer.

8. The light guide plate according to claim 1, wherein an interface between said first layer and said second layer is a joined surface of a concave curved surface toward said light exit surface on a side closer to one of said at least one light incidence surface and a convex curved surface toward said light exit surface on a side opposite from the one of said at least one light incidence surface.

9. The light guide plate according to claim 1, wherein an interface between said first layer and said second layer includes a concave curved surface toward said light exit surface on a side closer to one of said at least one light incidence surface, a parallel flat surface parallel to said light exit surface on a side opposite from the one of said at least one light incidence surface, and a convex curved surface toward said light exit surface joining said concave curved surface to said parallel flat surface.

10. The light guide plate according to claim 1, wherein an interface between said first layer and said second layer includes a concave curved surface toward said light exit surface on a side closer to one of said at least one light incidence surface, an inclined flat surface inclined with respect to said light exit surface on a side opposite from the one of said at least one light incidence surface, and a convex curved surface toward said light exit surface joining said concave curved surface to said inclined flat surface.

11. The light guide plate according to claim 1, wherein an interface between said first layer and said second layer includes a concave curved surface toward said light exit surface on a side closer to one of said at least one light incidence surface, a convex curved surface toward said light exit surface on a side opposite from the one of said at least one light incidence surface, and an inclined flat surface inclined with respect to said light exit surface and joining said concave curved surface to said convex curved surface.

12. The light guide plate according to claim 1, wherein Npo and Npr fall within ranges satisfying Npo=0 wt % and 0.01 wt %<Npr<0.4 wt %.

13. The light guide plate according to claim 1, wherein Npo and Npr fall within ranges satisfying 0 wt %<Npo<0.15 wt % and Npo<Npr<0.4 wt %.

14. The light guide plate according to claim 1, wherein said rear surface is a flat surface parallel to said light exit surface.

15. The light guide plate according to claim 1, wherein said rear surface is a surface inclined in a direction away from said light exit surface with increasing distance from said at least one light incidence surface.

16. The light guide plate according to claim 1, wherein the cross section in the direction perpendicular to said at least one light incidence surface extending from said at least one light incidence surface toward the central portion of said light exit surface also has a concave shape on a rear surface side.

17. The light guide plate according to claim 1, wherein said at least one light incidence surface is provided on one end side of said light exit surface.

18. The light guide plate according to claim 1, wherein said at least one light incidence surface comprises two light incidence surfaces provided on opposing two end sides of said light exit surface.

19. A planar lighting device comprising: the light guide plate according to claim 1, and an optical member including at least one microlens sheet on the side closer to said light exit surface of said light guide plate.

20. A liquid crystal display comprising: the planar lighting device according to claim 19, and a liquid crystal display panel on the side closer to a light exit surface of said planer lighting device.

* * * * *